(12) United States Patent
Gunzelmann et al.

(10) Patent No.: US 11,923,904 B2
(45) Date of Patent: Mar. 5, 2024

(54) ELECTRONIC DEVICES WITH HIGH FREQUENCY REFLECTIVE ANTENNA ARRAYS

(71) Applicant: Apple Inc., Cupertino, CA (US)

(72) Inventors: Bertram R Gunzelmann, Koenigsbrunn (DE); Zdravko Boos, Munich (DE)

(73) Assignee: Apple Inc., Cupertino, CA (US)

(*) Notice: Subject to any disclaimer, the term of this patent is extended or adjusted under 35 U.S.C. 154(b) by 0 days.

(21) Appl. No.: 17/827,290

(22) Filed: May 27, 2022

(65) Prior Publication Data
US 2023/0058998 A1     Feb. 23, 2023

Related U.S. Application Data

(60) Provisional application No. 63/235,611, filed on Aug. 20, 2021.

(51) Int. Cl.
*H04B 10/116* (2013.01)
*H04W 28/02* (2009.01)

(52) U.S. Cl.
CPC ...... *H04B 10/116* (2013.01); *H04W 28/0215* (2013.01)

(58) Field of Classification Search
CPC .......................... H04B 10/116; H04W 28/0215
USPC ...................................................... 398/100
See application file for complete search history.

(56) References Cited

U.S. PATENT DOCUMENTS

| | | | |
|---|---|---|---|
| 11,245,478 B1* | 2/2022 | Dunne | H04B 17/29 |
| 11,283,171 B2* | 3/2022 | Miehle | H01Q 23/00 |
| 2009/0278624 A1 | 11/2009 | Tsai et al. | |
| 2017/0054216 A1 | 2/2017 | Shi et al. | |
| 2018/0219637 A1* | 8/2018 | Mow | H04B 17/19 |
| 2019/0006753 A1 | 1/2019 | Swanson | |
| 2020/0021025 A1* | 1/2020 | Gomez Angulo | H01Q 1/243 |
| 2020/0076511 A1* | 3/2020 | Lim | H04B 10/6162 |
| 2021/0376465 A1* | 12/2021 | Dastjerdi | H01P 1/185 |

(Continued)

OTHER PUBLICATIONS

Qingqing Wu et al., Intelligent Reflecting Surface Aided Wireless Communications: A Tutorial, IEEE Transactions on Communications, Downloaded Mar. 1, 2021, pp. 1-29, IEEE.

(Continued)

*Primary Examiner* — Dalzid E Singh
(74) *Attorney, Agent, or Firm* — Treyz Law Group, P.C.; Michael H. Lyons

(57) ABSTRACT

An electronic device may include a photonics-based phased antenna array that conveys wireless signals at frequencies greater than 100 GHz. In a transmit mode, the array may transmit signals using the first and second optical signals. In a receive mode, the array may receive signals using the optical signals. In a passive mode, the array may reflect incident wireless signals as reflected signals. Photodiodes in the array may be controlled to exhibit output impedances that are mismatched with respect to input impedances of radiating elements in the array. Different mismatches can be used across the array or as a function of time to impart different phase and/or frequency shifts on the reflected signals. The phase shifts may be used to encode information into the reflected signals and/or to form a signal beam of the reflected signals.

20 Claims, 14 Drawing Sheets

(56) References Cited

U.S. PATENT DOCUMENTS

2022/0239014 A1* 7/2022 Sikri .................. H01Q 21/28

OTHER PUBLICATIONS

C. Mukherjee et al., First Uni-Traveling Carrier Photodiode Compact Model Enabling Future Terahertz Communication System Design, Downloaded Mar. 4, 2021, pp. 150-153, IEEE.

Zhang et al., Space-Time-Coding Digital Metasurfaces, 13th International Congress on Artificial Materials for Novel Wave Phenomena—Metamaterials 2019, Sep. 16-Sep. 21, 2019, pp. x-128-130, IEEE, Rome, Italy.

Ming Che et al., Optoelectronic THz-Wave Beam Steering by Arrayed Photomixers With Integrated Antennas, IEEE Photonics Technology Letters, Aug. 15, 2020, pp. 979-982, vol. 32, No. 16, IEEE.

Xiaoshen Song et al., Fully- / Partially-Connected Hybrid Beamforming Architectures for mmWave MU-MIMO, pp. 1-16, IEEE.

Cyril C. Renaud et al., Antenna Integrated THz Uni-Traveling Carrier Photodiodes, IEEE Journal of Selected Topics in Quantum Electronics, March/Apr. 2018, pp. 1-11, vol. 24, No. 2, IEEE.

Michele Natrella et al., Accurate equivalent circuit model for millimetre-wave UTC photodiodes, Feb. 25, 2016, pp. 1-16, vol. 24, No. 5, Optics Express.

Xilong Pei et al., RIS-Aided Wireless Communications: Prototyping, Adaptive Beamforming, and Indoor/Outdoor Field Trials, Feb. 28, 2021, pp. 1-13.

Chhandak Mukherjee et al., Efficient compact modelling of UTC-photodiode towards terahertz communication system design, Solid-State Electronics, 2020, pp. 1-11, HAL.

* cited by examiner

ELECTRONIC DEVICES WITH HIGH FREQUENCY REFLECTIVE ANTENNA ARRAYS

This application claims the benefit of U.S. Provisional Patent Application No. 63/235,611, filed Aug. 20, 2021, which is hereby incorporated by reference herein in its entirety.

FIELD

This disclosure relates generally to electronic devices and, more particularly, to electronic devices with wireless circuitry.

BACKGROUND

Electronic devices can be provided with wireless capabilities. An electronic device with wireless capabilities has wireless circuitry that includes one or more antennas. The wireless circuitry is used to perform communications using radio-frequency signals conveyed by the antennas.

As software applications on electronic devices become more data-intensive over time, demand has grown for electronic devices that support wireless communications at higher data rates. However, the maximum data rate supported by electronic devices is limited by the frequency of the radio-frequency signals. In addition, it can be difficult to implement wireless circuitry for handling high data rates in a resource-efficient and space-efficient manner, particularly when antennas are not always used to actively transmit or receive signals.

SUMMARY

An electronic device may include wireless circuitry controlled by one or more processors. The wireless circuitry may include transceiver circuitry, one or more antennas, and one or more optical signal paths that couple the transceiver circuitry to each of the antennas. To support extremely high data rates, the antennas may convey wireless signals at frequencies greater than or equal to about 100 GHz. Each antenna may both transmit and receive the wireless signals using a time division duplexing scheme, if desired.

The antenna may include an antenna radiating element coupled to a programmable photodiode such as a uni-travelling-carrier photodiode (UTC PD). The optical signal path may illuminate the UTC PD using a first optical local oscillator (LO) signal and a second optical LO signal that is offset in wavelength with respect to the first optical LO signal. If desired, an optical phase shift may be applied to the first optical LO signal. This may allow for signal beam forming in implementations where the antenna is formed in a phased antenna array.

The phased antenna array may be operable in one or more of a transmit mode, a receive mode, and a passive reflector mode. In the transmit mode, the phased antenna array transmits wireless signals using the first and second optical LO signals. In the receive mode, the phased antenna array receives wireless signals using the first and second optical LO signals. In the passive reflector mode, the phased antenna array does not transmit or receive wireless signals and the UTC PDs in the array are not illuminated by the first or second optical LO signals. The phased antenna array may receive incident wireless signals and may reflect the incident wireless signals as reflected signals. The UTC PDs may be controlled to exhibit selected output impedances that are mismatched with respect to the input impedances of the antenna radiating elements by one or more amounts. Different mismatches can be used across the array and/or as a function of time to impart different phase shifts and/or frequency shifts on the reflected signals. The phase shifts may be used to encode information into the reflected signals using space-time coding scheme and/or to form a signal beam of the reflected signals oriented in a selected direction.

An aspect of the disclosure provides an electronic device. The electronic device can include an antenna radiating element having an input impedance. The electronic device can include a photodiode coupled to the antenna radiating element and having an output impedance. The photodiode can be configured to receive a control signal that places the photodiode into a selected one of a first mode in which the input impedance is mismatched with respect to the output impedance at a frequency greater than or equal to 100 GHz or a second mode in which the input impedance matches the output impedance at the frequency. The electronic device can include an optical signal path configured to illuminate the photodiode using a first optical local oscillator (LO) signal and a second optical LO signal that is offset in wavelength with respect to the first optical LO signal while the photodiode is in the second mode. The antenna radiating element can be configured to reflect wireless signals at the frequency while the photodiode is in the first mode.

An aspect of the disclosure provides a method of operating an electronic device having an array of antennas that include antenna radiating elements and photodiodes coupled to the antenna radiating elements. The method can include with the photodiodes, generating currents on the antenna radiating elements that transmit first wireless signals at a frequency greater than or equal to 100 GHz while the photodiodes are illuminated using a first optical local oscillator (LO) signal and a second optical LO signal that is offset in wavelength with respect to the first optical LO signal. The method can include with the antenna radiating elements, reflecting second wireless signals at the frequency while the photodiodes are controlled to exhibit one or more output impedances that are mismatched at the frequency with respect to input impedances of the antenna radiating elements.

An aspect of the disclosure provides an electronic device. An electronic device can include an antenna radiating element having an input impedance. The electronic device can include a photodiode that is coupled to the antenna radiating element and that is configured, using a control signal, to exhibit an output impedance that mismatches an input impedance of the antenna radiating element at a frequency greater than or equal to 100 GHz.

An aspect of the disclosure provides an electronic device. The electronic device can include a phased antenna array. The electronic device can include one or more processors configured to place the phased antenna array in a first mode in which the phased antenna array is configured to transmit first wireless signals, a second mode in which the phased antenna array is configured to receive second wireless signals, and a third mode in which the phased antenna array is configured to reflect third wireless signals incident upon the phased antenna array.

DETAILED DESCRIPTION

Figure 1:
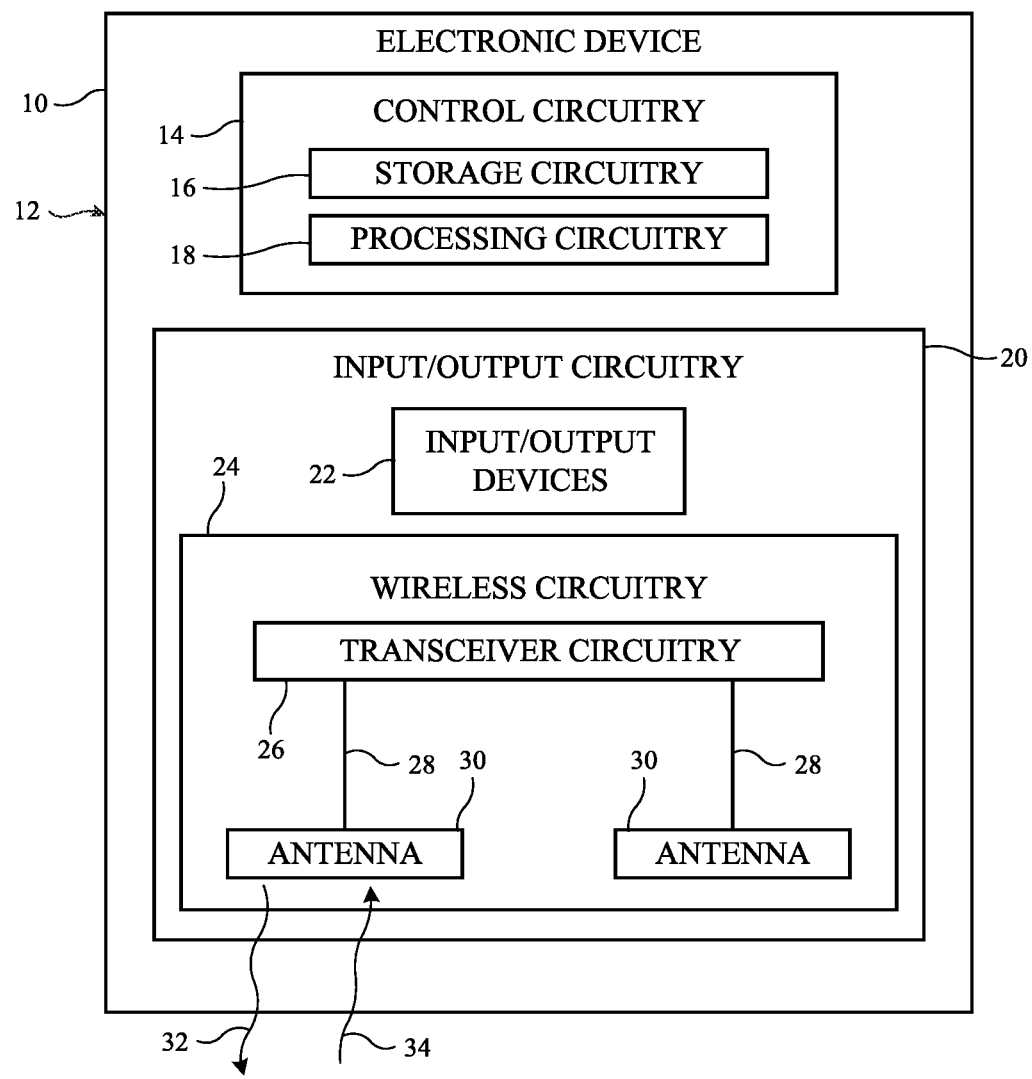
FIG. 1 is a block diagram of an illustrative electronic device having wireless circuitry with at least one antenna that both transmits and receives wireless signals at frequencies greater than about 100 GHz in accordance with some embodiments.

Electronic device 10 of FIG. 1 (sometimes referred to herein as electro-optical device 10) may be a computing device such as a laptop computer, a desktop computer, a computer monitor containing an embedded computer, a tablet computer, a cellular telephone, a media player, or other handheld or portable electronic device, a smaller device such as a wristwatch device, a pendant device, a headphone or earpiece device, a device embedded in eyeglasses, goggles, or other equipment worn on a user's head, or other wearable or miniature device, a television, a computer display that does not contain an embedded computer, a gaming device, a navigation device, an embedded system such as a system in which electronic equipment with a display is mounted in a kiosk or automobile, a wireless internet-connected voice-controlled speaker, a home entertainment device, a remote control device, a gaming controller, a peripheral user input device, a wireless base station or access point, equipment that implements the functionality of two or more of these devices, or other electronic equipment.

As shown in the functional block diagram of FIG. 1, device 10 may include components located on or within an electronic device housing such as housing 12. Housing 12, which may sometimes be referred to as a case, may be formed of plastic, glass, ceramics, fiber composites, metal (e.g., stainless steel, aluminum, metal alloys, etc.), other suitable materials, or a combination of these materials. In some situations, parts or all of housing 12 may be formed from dielectric or other low-conductivity material (e.g., glass, ceramic, plastic, sapphire, etc.). In other situations, housing 12 or at least some of the structures that make up housing 12 may be formed from metal elements.

Device 10 may include control circuitry 14. Control circuitry 14 may include storage such as storage circuitry 16. Storage circuitry 16 may include hard disk drive storage, nonvolatile memory (e.g., flash memory or other electrically-programmable-read-only memory configured to form a solid-state drive), volatile memory (e.g., static or dynamic random-access-memory), etc. Storage circuitry 16 may include storage that is integrated within device 10 and/or removable storage media.

Control circuitry 14 may include processing circuitry such as processing circuitry 18. Processing circuitry 18 may be used to control the operation of device 10. Processing circuitry 18 may include on one or more processors, microprocessors, microcontrollers, digital signal processors, host processors, baseband processor integrated circuits, application specific integrated circuits, central processing units (CPUs), graphics processing units (GPUs), etc. Control circuitry 14 may be configured to perform operations in device 10 using hardware (e.g., dedicated hardware or circuitry), firmware, and/or software. Software code for performing operations in device 10 may be stored on storage circuitry 16 (e.g., storage circuitry 16 may include non-transitory (tangible) computer readable storage media that stores the software code). The software code may sometimes be referred to as program instructions, software, data, instructions, or code. Software code stored on storage circuitry 16 may be executed by processing circuitry 18.

Control circuitry 14 may be used to run software on device 10 such as satellite navigation applications, internet browsing applications, voice-over-internet-protocol (VOIP) telephone call applications, email applications, media playback applications, operating system functions, etc. To support interactions with external equipment, control circuitry 14 may be used in implementing communications protocols. Communications protocols that may be implemented using control circuitry 14 include internet protocols, wireless local area network (WLAN) protocols (e.g., IEEE 802.11 protocols—sometimes referred to as Wi-Fi®), protocols for other short-range wireless communications links such as the Bluetooth® protocol or other wireless personal area network (WPAN) protocols, IEEE 802.11ad protocols (e.g., ultra-wideband protocols), cellular telephone protocols (e.g., 3G protocols, 4G (LTE) protocols, 3GPP Fifth Generation (5G) New Radio (NR) protocols, Sixth Generation (6G) protocols, sub-THz protocols, THz protocols, etc.), antenna diversity protocols, satellite navigation system protocols (e.g., global positioning system (GPS) protocols, global navigation satellite system (GLONASS) protocols, etc.), antenna-based spatial ranging protocols, optical communications protocols, or any other desired communications protocols. Each communications protocol may be associated with a corresponding radio access technology (RAT) that specifies the physical connection methodology used in implementing the protocol.

Device 10 may include input-output circuitry 20. Input-output circuitry 20 may include input-output devices 22. Input-output devices 22 may be used to allow data to be supplied to device 10 and to allow data to be provided from device 10 to external devices. Input-output devices 22 may include user interface devices, data port devices, and other input-output components. For example, input-output devices 22 may include touch sensors, displays (e.g., touch-sensitive and/or force-sensitive displays), light-emitting components such as displays without touch sensor capabilities, buttons (mechanical, capacitive, optical, etc.), scrolling wheels, touch pads, key pads, keyboards, microphones, cameras, buttons, speakers, status indicators, audio jacks and other audio port components, digital data port devices, motion sensors (accelerometers, gyroscopes, and/or compasses that detect motion), capacitance sensors, proximity sensors, magnetic sensors, force sensors (e.g., force sensors coupled to a display to detect pressure applied to the display), temperature sensors, etc. In some configurations, keyboards, headphones, displays, pointing devices such as trackpads, mice, and joysticks, and other input-output devices may be coupled to device 10 using wired or wireless connections (e.g., some of input-output devices 22 may be peripherals that are coupled to a main processing unit or other portion of device 10 via a wired or wireless link).

Input-output circuitry 20 may include wireless circuitry 24 to support wireless communications. Wireless circuitry 24 (sometimes referred to herein as wireless communications circuitry 24) may include one or more antennas 30.

Wireless circuitry 24 may also include transceiver circuitry 26. Transceiver circuitry 26 may include transmitter circuitry, receiver circuitry, modulator circuitry, demodulator circuitry (e.g., one or more modems), radio-frequency circuitry, one or more radios, intermediate frequency circuitry, optical transmitter circuitry, optical receiver circuitry, optical light sources, other optical components, baseband circuitry (e.g., one or more baseband processors), amplifier circuitry, clocking circuitry such as one or more local oscillators and/or phase-locked loops, memory, one or more registers, filter circuitry, switching circuitry, analog-to-digital converter (ADC) circuitry, digital-to-analog converter (DAC) circuitry, radio-frequency transmission lines, optical fibers, and/or any other circuitry for transmitting and/or receiving wireless signals using antennas 30. The components of transceiver circuitry 26 may be implemented on one integrated circuit, chip, system-on-chip (SOC), die, printed circuit board, substrate, or package, or the components of transceiver circuitry 26 may be distributed across two or more integrated circuits, chips, SOCs, printed circuit boards, substrates, and/or packages.

The example of FIG. 1 is merely illustrative. While control circuitry 14 is shown separately from wireless circuitry 24 in the example of FIG. 1 for the sake of clarity, wireless circuitry 24 may include processing circuitry (e.g., one or more processors) that forms a part of processing circuitry 18 and/or storage circuitry that forms a part of storage circuitry 16 of control circuitry 14 (e.g., portions of control circuitry 14 may be implemented on wireless circuitry 24). As an example, control circuitry 14 may include baseband circuitry (e.g., one or more baseband processors), digital control circuitry, analog control circuitry, and/or other control circuitry that forms part of wireless circuitry 24. The baseband circuitry may, for example, access a communication protocol stack on control circuitry 14 (e.g., storage circuitry 20) to: perform user plane functions at a PHY layer, MAC layer, RLC layer, PDCP layer, SDAP layer, and/or PDU layer, and/or to perform control plane functions at the PHY layer, MAC layer, RLC layer, PDCP layer, RRC, layer, and/or non-access stratum layer.

Transceiver circuitry 26 may be coupled to each antenna 30 in wireless circuitry 24 over a respective signal path 28. Each signal path 28 may include one or more radio-frequency transmission lines, waveguides, optical fibers, and/or any other desired lines/paths for conveying wireless signals between transceiver circuitry 26 and antenna 30. Antennas 30 may be formed using any desired antenna structures for conveying wireless signals. For example, antennas 30 may include antennas with resonating elements that are formed from dipole antenna structures, planar dipole antenna structures (e.g., bowtie antenna structures), slot antenna structures, loop antenna structures, patch antenna structures, inverted-F antenna structures, planar inverted-F antenna structures, helical antenna structures, monopole antennas, dipoles, hybrids of these designs, etc. Filter circuitry, switching circuitry, impedance matching circuitry, and/or other antenna tuning components may be adjusted to adjust the frequency response and wireless performance of antennas 30 over time.

If desired, two or more of antennas 30 may be integrated into a phased antenna array (sometimes referred to herein as a phased array antenna) in which each of the antennas conveys wireless signals with a respective phase and magnitude that is adjusted over time so the wireless signals constructively and destructively interfere to produce (form) a signal beam in a given pointing direction. The term "convey wireless signals" as used herein means the transmission and/or reception of the wireless signals (e.g., for performing unidirectional and/or bidirectional wireless communications with external wireless communications equipment). Antennas 30 may transmit the wireless signals by radiating the signals into free space (or to free space through intervening device structures such as a dielectric cover layer). Antennas 30 may additionally or alternatively receive the wireless signals from free space (e.g., through intervening devices structures such as a dielectric cover layer). The transmission and reception of wireless signals by antennas 30 each involve the excitation or resonance of antenna currents on an antenna resonating (radiating) element in the antenna by the wireless signals within the frequency band(s) of operation of the antenna.

Transceiver circuitry 26 may use antenna(s) 30 to transmit and/or receive wireless signals that convey wireless communications data between device 10 and external wireless communications equipment (e.g., one or more other devices such as device 10, a wireless access point or base station, etc.). The wireless communications data may be conveyed bidirectionally or unidirectionally. The wireless communications data may, for example, include data that has been encoded into corresponding data packets such as wireless data associated with a telephone call, streaming media content, internet browsing, wireless data associated with software applications running on device 10, email messages, etc.

Additionally or alternatively, wireless circuitry 24 may use antenna(s) 30 to perform wireless sensing operations. The sensing operations may allow device 10 to detect (e.g., sense or identify) the presence, location, orientation, and/or velocity (motion) of objects external to device 10. Control circuitry 14 may use the detected presence, location, orientation, and/or velocity of the external objects to perform any desired device operations. As examples, control circuitry 14 may use the detected presence, location, orientation, and/or velocity of the external objects to identify a corresponding user input for one or more software applications running on device 10 such as a gesture input performed by the user's hand(s) or other body parts or performed by an external stylus, gaming controller, head-mounted device, or other peripheral devices or accessories, to determine when one or more antennas 30 needs to be disabled or provided with a reduced maximum transmit power level (e.g., for satisfying regulatory limits on radio-frequency exposure), to determine how to steer (form) a radio-frequency signal beam produced by antennas 30 for wireless circuitry 24 (e.g., in scenarios where antennas 30 include a phased array of antennas 30), to map or model the environment around device 10 (e.g., to produce a software model of the room where device 10 is located for use by an augmented reality application, gaming application, map application, home design application, engineering application, etc.), to detect the presence of obstacles in the vicinity of (e.g., around) device 10 or in the direction of motion of the user of device 10, etc.

Wireless circuitry 24 may transmit and/or receive wireless signals within corresponding frequency bands of the electromagnetic spectrum (sometimes referred to herein as communications bands or simply as "bands"). The frequency bands handled by transceiver circuitry 26 may include wireless local area network (WLAN) frequency bands (e.g., Wi-Fi® (IEEE 802.11) or other WLAN communications bands) such as a 2.4 GHz WLAN band (e.g., from 2400 to 2480 MHz), a 5 GHz WLAN band (e.g., from 5180 to 5825 MHz), a Wi-Fi® 6E band (e.g., from 5925-7125 MHz), and/or other Wi-Fi® bands (e.g., from 1875-5160 MHz), wireless personal area network (WPAN) frequency bands such as the 2.4 GHz Bluetooth® band or other WPAN communications bands, cellular telephone frequency bands (e.g., bands from about 600 MHz to about 5 GHz, 3G bands, 4G LTE bands, 5G New Radio Frequency Range 1 (FR1) bands below 10 GHz, 5G New Radio Frequency Range 2 (FR2) bands between 20 and 60 GHz, etc.), other centimeter or millimeter wave frequency bands between 10-100 GHz, near-field communications frequency bands (e.g., at 13.56 MHz), satellite navigation frequency bands (e.g., a GPS band from 1565 to 1610 MHz, a Global Navigation Satellite System (GLONASS) band, a BeiDou Navigation Satellite System (BDS) band, etc.), ultra-wideband (UWB) frequency bands that operate under the IEEE 802.15.4 protocol and/or other ultra-wideband communications protocols, communications bands under the family of 3GPP wireless communications standards, communications bands under the IEEE 802.XX family of standards, and/or any other desired frequency bands of interest.

Over time, software applications on electronic devices such as device 10 have become more and more data intensive. Wireless circuitry on the electronic devices therefore needs to support data transfer at higher and higher data rates. In general, the data rates supported by the wireless circuitry are proportional to the frequency of the wireless signals conveyed by the wireless circuitry (e.g., higher frequencies can support higher data rates than lower frequencies). Wireless circuitry 24 may convey centimeter and millimeter wave signals to support relatively high data rates (e.g., because centimeter and millimeter wave signals are at relatively high frequencies between around 10 GHz and 100 GHz). However, the data rates supported by centimeter and millimeter wave signals may still be insufficient to meet all the data transfer needs of device 10. To support even higher data rates such as data rates up to 5-10 Gbps or higher, wireless circuitry 24 may convey wireless signals at frequencies greater than 100 GHz.

As shown in FIG. 1, wireless circuitry 24 may transmit wireless signals 32 and may receive wireless signals 34 at frequencies greater than around 100 GHz. Wireless signals 32 and 34 may sometimes be referred to herein as tremendously high frequency (THF) signals 32 and 34, sub-THz signals 32 and 34, THz signals 32 and 34, or sub-millimeter wave signals 32 and 34. THF signals 32 and 34 may be at sub-THz or THz frequencies such as frequencies between 100 GHz and 1 THz, between 100 GHz and 10 THz, between 100 GHz and 2 THz, between 200 GHz and 1 THz, between 300 GHz and 1 THz, between 300 GHz and 2 THz, between 300 GHz and 10 THz, between 100 GHz and 800 GHz, between 200 GHz and 1.5 THz, etc. (e.g., within a sub-THz, THz, THF, or sub-millimeter frequency band such as a 6G frequency band). The high data rates supported by these frequencies may be leveraged by device 10 to perform cellular telephone voice and/or data communications (e.g., while supporting spatial multiplexing to provide further data bandwidth), to perform spatial ranging operations such as radar operations to detect the presence, location, and/or velocity of objects external to device 10, to perform automotive sensing (e.g., with enhanced security), to perform health/body monitoring on a user of device 10 or another person, to perform gas or chemical detection, to form a high data rate wireless connection between device 10 and another device or peripheral device (e.g., to form a high data rate connection between a display driver on device 10 and a display that displays ultra-high resolution video), to form a remote radio head (e.g., a flexible high data rate connection), to form a THF chip-to-chip connection within device 10 that supports high data rates (e.g., where one antenna 30 on a first chip in device 10 transmits THF signals 32 to another antenna 30 on a second chip in device 10), and/or to perform any other desired high data rate operations.

Space is at a premium within electronic devices such as device 10. In some scenarios, different antennas 30 are used to transmit THF signals 32 than are used to receive THF signals 34. However, handling transmission of THF signals 32 and reception of THF signals 34 using different antennas 30 can consume an excessive amount of space and other resources within device 10 because two antennas 30 and signal paths 28 would be required to handle both transmission and reception. To minimize space and resource consumption within device 10, the same antenna 30 and signal path 28 may be used to both transmit THF signals 32 and to receive THF signals 34. If desired, multiple antennas 30 in wireless circuitry 24 may transmit THF signals 32 and may receive THF signals 34. The antennas may be integrated into a phased antenna array that transmits THF signals 32 and that receives THF signals 34 within a corresponding signal beam oriented in a selected beam pointing direction.

It can be challenging to incorporate components into wireless circuitry 24 that support wireless communications at these high frequencies. If desired, transceiver circuitry 26 and signal paths 28 may include optical components that convey optical signals to support the transmission of THF signals 32 and the reception of THF signals 34 in a space and resource-efficient manner. The optical signals may be used in transmitting THF signals 32 at THF frequencies and in receiving THF signals 34 at THF frequencies.

Figure 2:
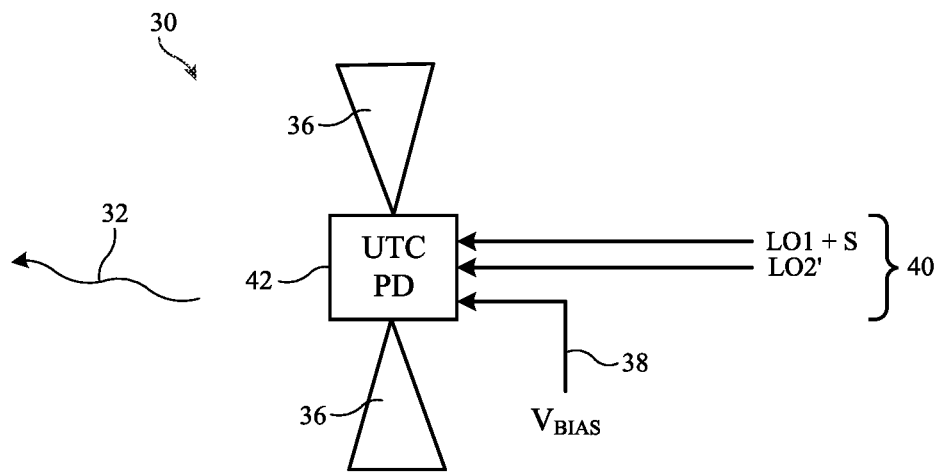
FIG. 2 is a top view of an illustrative antenna that transmits wireless signals at frequencies greater than about 100 GHz based on optical local oscillator (LO) signals in accordance with some embodiments.

FIG. 2 is a diagram of an illustrative antenna 30 that may be used to both transmit THY signals 32 and to receive THF signals 34 using optical signals. Antenna 30 may include one or more antenna radiating (resonating) elements such as radiating (resonating) element arms 36. In the example of FIG. 2, antenna 30 is a planar dipole antenna (sometimes referred to as a "bowtie" antenna) having two opposing radiating element arms 36 (e.g., bowtie arms or dipole arms). This is merely illustrative and, in general, antenna 30 may be any type of antenna having any desired antenna radiating element architecture.

As shown in FIG. 2, antenna 30 includes a photodiode (PD) 42 coupled between radiating element arms 36. Electronic devices that include antennas 30 with photodiodes 42 such as device 10 may sometimes also be referred to as electro-optical devices (e.g., electro-optical device 10). Photodiode 42 may be a programmable photodiode. An example in which photodiode 42 is a programmable uni-travelling-carrier photodiode (UTC PD) is described herein as an example. Photodiode 42 may therefore sometimes be referred to herein as UTC PD 42 or programmable UTC PD 42. This is merely illustrative and, in general, photodiode 42 may include any desired type of adjustable/programmable photodiode or component that converts electromagnetic energy at optical frequencies to current at THF frequencies on radiating element arms 36 and/or vice versa. Each radiating element arm 36 may, for example, have a first edge at UTC PD 42 and a second edge opposite the first edge that is wider than the first edge (e.g., in implementations where antenna 30 is a bowtie antenna). Other radiating elements may be used if desired.

UTC PD 42 may have a bias terminal 38 that receives one or more control signals $V_{BIAS}$. Control signals $V_{BIAS}$ may include bias voltages provided at one or more voltage levels and/or other control signals for controlling the operation of UTC PD 42 such as impedance adjustment control signals for adjusting the output impedance of UTC PD 42. Control circuitry 14 (FIG. 1) may provide (e.g., apply, supply, assert, etc.) control signals $V_{BIAS}$ at different settings (e.g., values, magnitudes, etc.) to dynamically control (e.g., program or adjust) the operation of UTC PD 42 over time. For example, control signals $V_{BIAS}$ may be used to control whether antenna 30 transmits THF signals 32 or receives THF signals 34. When control signals $V_{BIAS}$ include a bias voltage asserted at a first level or magnitude, antenna 30 may be configured to transmit THF signals 32. When control signals $V_{BIAS}$ include a bias voltage asserted at a second level or magnitude, antenna 30 may be configured to receive THF signals 34. In the example of FIG. 2, control signals $V_{BIAS}$ include the bias voltage asserted at the first level to configure antenna 30 to transmit THF signals 32. If desired, control signals $V_{BIAS}$ may also be adjusted to control the waveform of the THF signals (e.g., as a squaring function that preserves the modulation of incident optical signals, a linear function, etc.), to perform gain control on the signals conveyed by antenna 30, and/or to adjust the output impedance of UTC PD 42.

As shown in FIG. 2, UTC PD 42 may be optically coupled to optical path 40. Optical path 40 may include one or more optical fibers or waveguides. UTC PD 42 may receive optical signals from transceiver circuitry 26 (FIG. 1) over optical path 40. The optical signals may include a first optical local oscillator (LO) signal LO1 and a second optical local oscillator signal LO2. Optical local oscillator signals LO1 and LO2 may be generated by light sources in transceiver circuitry 26 (FIG. 1). Optical local oscillator signals LO1 and LO2 may be at optical wavelengths (e.g., between 400 nm and 700 nm), ultra-violet wavelengths (e.g., near-ultra-violet or extreme ultraviolet wavelengths), and/or infrared wavelengths (e.g., near-infrared wavelengths, mid-infrared wavelengths, or far-infrared wavelengths). Optical local oscillator signal LO2 may be offset in wavelength from optical local oscillator signal LO1 by a wavelength offset X. Wavelength offset X may be equal to the wavelength of the THF signals conveyed by antenna 30 (e.g., between 100 GHz and 1 THz (1000 GHz), between 100 GHz and 2 THz, between 300 GHz and 800 GHz, between 300 GHz and 1 THz, between 300 and 400 GHz, etc.).

During signal transmission, wireless data (e.g., wireless data packets, symbols, frames, etc.) may be modulated onto optical local oscillator signal LO2 to produce modulated optical local oscillator signal LO2'. If desired, optical local oscillator signal LO1 may be provided with an optical phase shift S. Optical path 40 may illuminate UTC PD 42 with optical local oscillator signal LO1 (plus the optical phase shift S when applied) and modulated optical local oscillator signal LO2'. If desired, lenses or other optical components may be interposed between optical path 40 and UTC PD 42 to help focus the optical local oscillator signals onto UTC PD 42.

UTC PD 42 may convert optical local oscillator signal LO1 and modulated local oscillator signal LO2' (e.g., beats between the two optical local oscillator signals) into antenna currents that run along the perimeter of radiating element arms 36. The frequency of the antenna currents is equal to the frequency difference between local oscillator signal LO1 and modulated local oscillator signal LO2'. The antenna currents may radiate (transmit) THF signals 32 into free space. Control signal $V_{BIAS}$ may control UTC PD 42 to convert the optical local oscillator signals into antenna currents on radiating element arms 36 while preserving the modulation and thus the wireless data on modulated local oscillator signal LO2' (e.g., by applying a squaring function to the signals). THF signals 32 will thereby carry the modulated wireless data for reception and demodulation by external wireless communications equipment.

Figure 3:
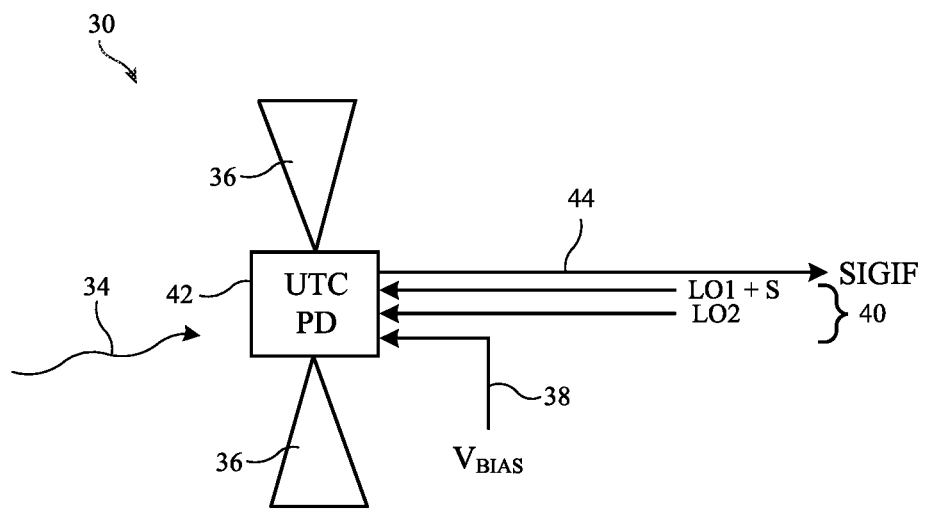
FIG. 3 is a top view showing how an illustrative antenna of the type shown in FIG. 2 may convert received wireless signals at frequencies greater than about 100 GHz into intermediate frequency signals based on optical LO signals in accordance with some embodiments.

FIG. 3 is a diagram showing how antenna 30 may receive THF signals 34 (e.g., after changing the setting of control signals $V_{BIAS}$ into a reception state from the transmission state of FIG. 2). As shown in FIG. 3, THF signals 34 may be incident upon antenna radiating element arms 36. The incident THF signals 34 may produce antenna currents that flow around the perimeter of radiating element arms 36. UTC PD 42 may use optical local oscillator signal LO1 (plus the optical phase shift S when applied), optical local oscillator signal LO2 (e.g., without modulation), and control signals $V_{BIAS}$ (e.g., a bias voltage asserted at the second level) to convert the received THF signals 34 into intermediate frequency signals SIGIF that are output onto intermediate frequency signal path 44.

The frequency of intermediate frequency signals SIGIF may be equal to the frequency of THF signals 34 minus the difference between the frequency of optical local oscillator signal LO1 and the frequency of optical local oscillator signal LO2. As an example, intermediate frequency signals SIGIF may be at lower frequencies than THF signals 32 and 34 such as centimeter or millimeter wave frequencies between 10 GHz and 100 GHz, between 30 GHz and 80 GHz, around 60 GHz, etc. If desired, transceiver circuitry 26 (FIG. 1) may change the frequency of optical local oscillator signal LO1 and/or optical local oscillator signal LO2 when switching from transmission to reception or vice versa. UTC PD 42 may preserve the data modulation of THF signals 34 in intermediate signals SIGIF. A receiver in transceiver circuitry 26 (FIG. 1) may demodulate intermediate frequency signals SIGIF (e.g., after further down conversion) to recover the wireless data from THF signals 34. In another example, wireless circuitry 24 may convert intermediate frequency signals SIGIF to the optical domain before recovering the wireless data. In yet another example, intermediate frequency signal path 44 may be omitted and UTC PD 42 may convert THF signals 34 into the optical domain for subsequent demodulation and data recovery (e.g., in a sideband of the optical signal).

Figure 4:
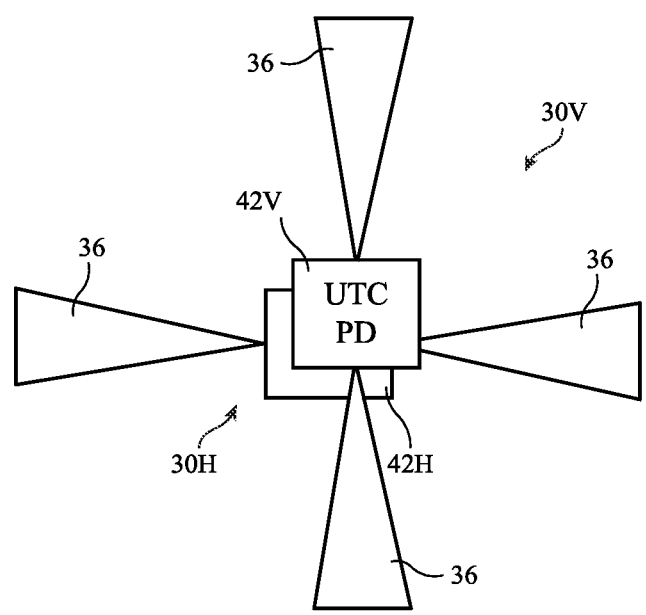
FIG. 4 is a top view showing how multiple antennas of the type shown in FIGS. 2 and 3 may be stacked to cover multiple polarizations in accordance with some embodiments.

The antenna 30 of FIGS. 2 and 3 may support transmission of THF signals 32 and reception of THF signals 34 with a given polarization (e.g., a linear polarization such as a vertical polarization). If desired, wireless circuitry 24 (FIG. 1) may include multiple antennas 30 for covering different polarizations. FIG. 4 is a diagram showing one example of how wireless circuitry 24 may include multiple antennas 30 for covering different polarizations.

As shown in FIG. 4, the wireless circuitry may include a first antenna 30 such as antenna 30V for covering a first polarization (e.g., a first linear polarization such as a vertical polarization) and may include a second antenna 30 such as antenna 30H for covering a second polarization different from or orthogonal to the first polarization (e.g., a second linear polarization such as a horizontal polarization). Antenna 30V may have a UTC PD 42 such as UTC PD 42V coupled between a corresponding pair of radiating element arms 36. Antenna 30H may have a UTC PD 42 such as UTC PD 42H coupled between a corresponding pair of radiating element arms 36 oriented non-parallel (e.g., orthogonal) to the radiating element arms 36 in antenna 30V. This may allow antennas 30V and 30H to transmit THF signals 32 with respective (orthogonal) polarizations and may allow antennas 30V and 30H to receive THF signals 32 with respective (orthogonal) polarizations.

To minimize space within device 10, antenna 30V may be vertically stacked over or under antenna 30H (e.g., where UTC PD 42V partially or completely overlaps UTC PD 42H). In this example, antennas 30V and 30H may both be formed on the same substrate such as a rigid or flexible printed circuit board. The substrate may include multiple stacked dielectric layers (e.g., layers of ceramic, epoxy, flexible printed circuit board material, rigid printed circuit board material, etc.). The radiating element arms 36 in antenna 30V may be formed on a separate layer of the substrate than the radiating element arms 36 in antenna 30H or the radiating element arms 36 in antenna 30V may be formed on the same layer of the substrate as the radiating element arms 36 in antenna 30H. UTC PD 42V may be formed on the same layer of the substrate as UTC PD 42H or UTC PD 42V may be formed on a separate layer of the substrate than UTC PD 42H. UTC PD 42V may be formed on the same layer of the substrate as the radiating element arms 36 in antenna 30V or may be formed on a separate layer of the substrate as the radiating element arms 36 in antenna 30V. UTC PD 42H may be formed on the same layer of the substrate as the radiating element arms 36 in antenna 30H or may be formed on a separate layer of the substrate as the radiating element arms 36 in antenna 30H.

Figure 5:
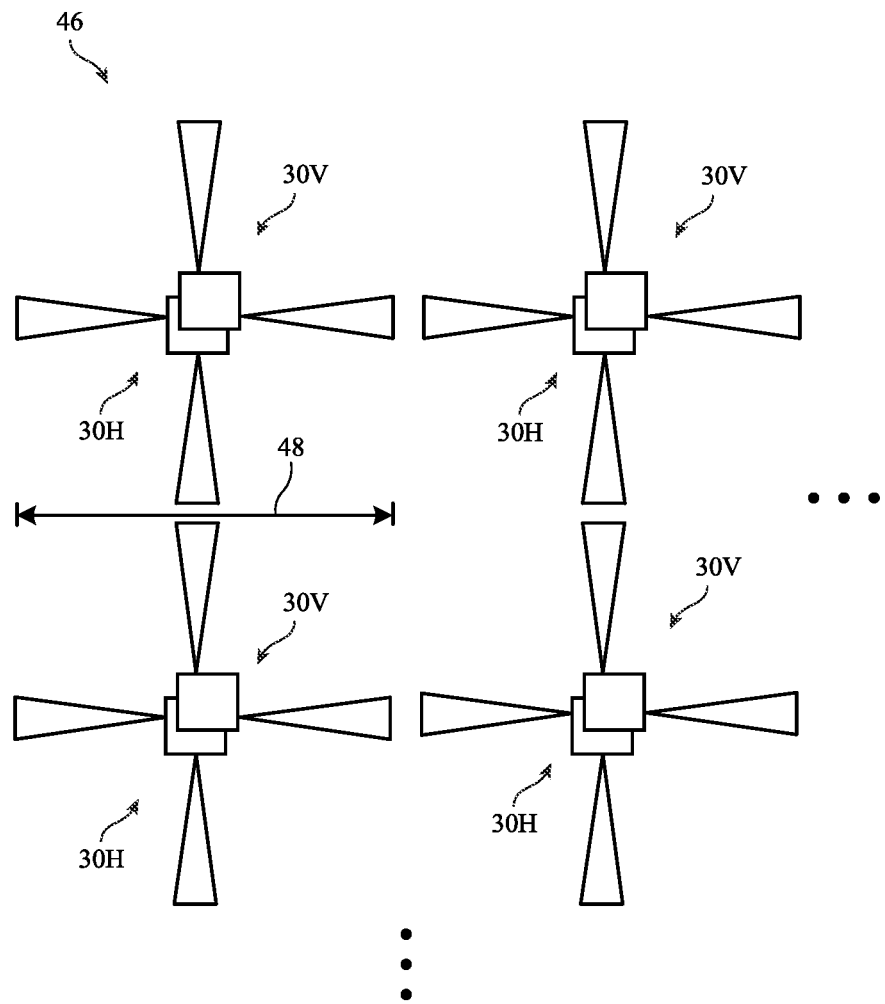
FIG. 5 is a top view showing how stacked antennas of the type shown in FIG. 4 may be integrated into a phased antenna array for conveying wireless signals at frequencies greater than about 100 GHz within a corresponding signal beam.

If desired, antennas 30 or antennas 30H and 30V of FIG. 4 may be integrated within a phased antenna array. FIG. 5 is a diagram showing one example of how antennas 30H and 30V may be integrated within a phased antenna array. As shown in FIG. 5, device 10 may include a phased antenna array 46 of stacked antennas 30H and 30V arranged in a rectangular grid of rows and columns. Each of the antennas in phased antenna array 46 may be formed on the same substrate. This is merely illustrative. In general, phased antenna array 46 (sometimes referred to as a phased array antenna) may include any desired number of antennas 30V and 30H (or non-stacked antennas 30) arranged in any desired pattern. Each of the antennas in phased antenna array 46 may be provided with a respective optical phase shift S (FIGS. 2 and 3) that configures the antennas to collectively transmit THF signals 32 and/or receive THF signals 34 that sum to form a signal beam of THF signals in a desired beam pointing direction. The beam pointing direction may be selected to point the signal beam towards external communications equipment, towards a desired external object, away from an external object, etc.

Phased antenna array 46 may occupy relatively little space within device 10. For example, each antenna 30V/30H may have a length 48 (e.g., as measured from the end of one radiating element arm to the opposing end of the opposite radiating element arm). Length 48 may be approximately equal to one-half the wavelength of THF signals 32 and 34. For example, length 48 may be as small as 0.5 mm or less. Each UTC-PD 42 in phased antenna array 46 may occupy a lateral area of 100 square microns or less. This may allow phased antenna array 46 to occupy very little area within device 10, thereby allowing the phased antenna array to be integrated within different portions of device 10 while still allowing other space for device components. The examples of FIGS. 2-5 are merely illustrative and, in general, each antenna may have any desired antenna radiating element architecture.

Figure 6:
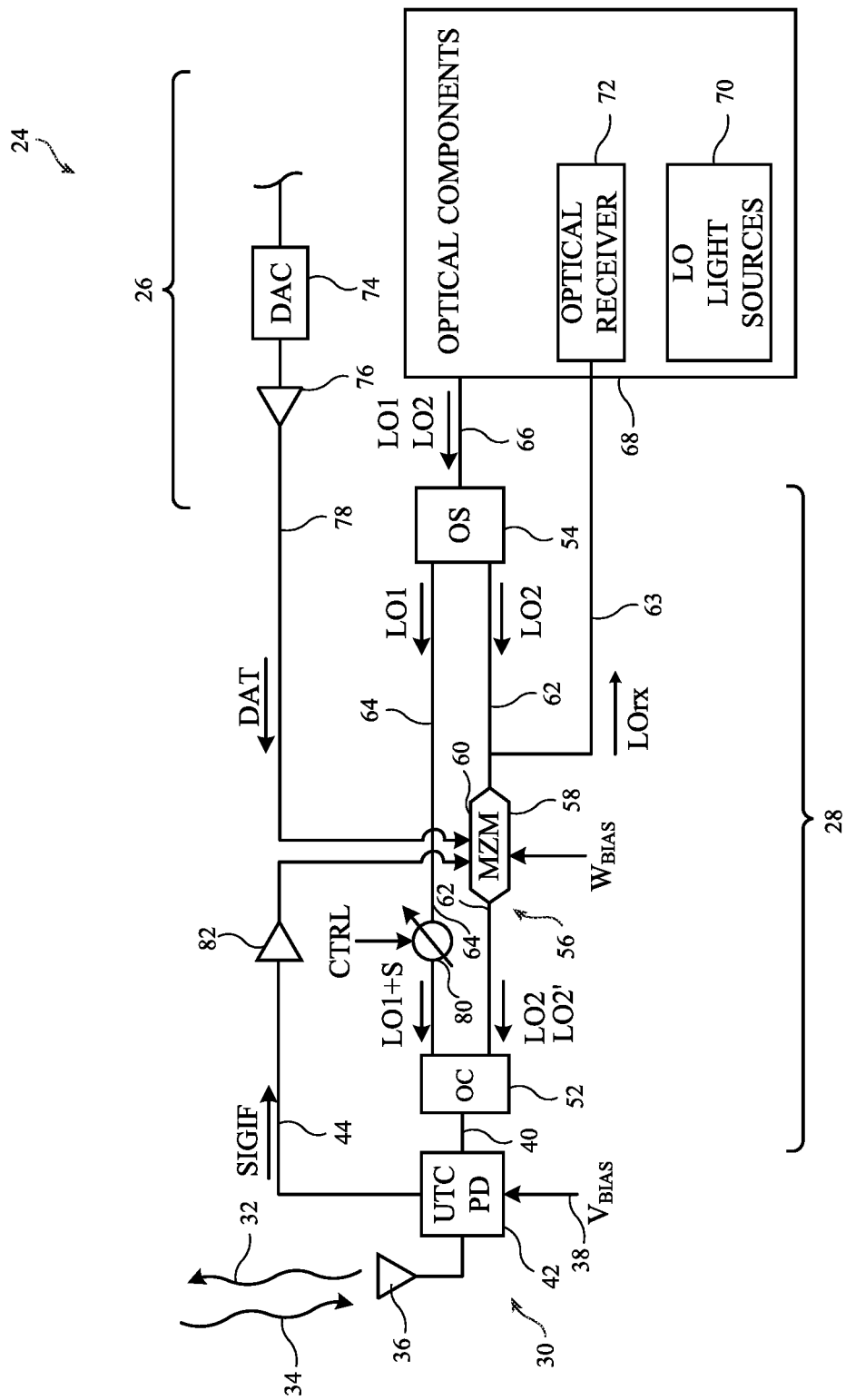
FIG. 6 is a circuit diagram of illustrative wireless circuitry having an antenna that transmits wireless signals at frequencies greater than about 100 GHz and that receives wireless signals at frequencies greater than about 100 GHz for conversion to intermediate frequencies and then to the optical domain in accordance with some embodiments.

FIG. 6 is a circuit diagram showing how a given antenna 30 and signal path 28 (FIG. 1) may be used to both transmit THF signals 32 and receive THF signals 34 based on optical local oscillator signals. In the example of FIG. 6, UTC PD 42 converts received THF signals 34 into intermediate frequency signals SIGIF that are then converted to the optical domain for recovering the wireless data from the received THF signals.

As shown in FIG. 6, wireless circuitry 24 may include transceiver circuitry 26 coupled to antenna 30 over signal path 28 (e.g., an optical signal path sometimes referred to herein as optical signal path 28). UTC PD 42 may be coupled between the radiating element arm(s) 36 of antenna 30 and signal path 28. Transceiver circuitry 26 may include optical components 68, amplifier circuitry such as power amplifier 76, and digital-to-analog converter (DAC) 74. Optical components 68 may include an optical receiver such as optical receiver 72 and optical local oscillator (LO) light sources (emitters) 70. LO light sources 70 may include two or more light sources such as laser light sources, laser diodes, optical phase locked loops, or other optical emitters that emit light (e.g., optical local oscillator signals LO1 and LO2) at respective wavelengths. If desired, LO light sources 70 may include a single light source and may include optical components for splitting the light emitted by the light source into different wavelengths. Signal path 28 may be coupled to optical components 68 over optical path 66. Optical path 66 may include one or more optical fibers and/or waveguides.

Signal path 28 may include an optical splitter such as optical splitter (OS) 54, optical paths such as optical path 64 and optical path 62, an optical combiner such as optical combiner (OC) 52, and optical path 40. Optical path 62 may be an optical fiber or waveguide. Optical path 64 may be an optical fiber or waveguide. Optical splitter 54 may have a first (e.g., input) port coupled to optical path 66, a second (e.g., output) port coupled to optical path 62, and a third (e.g., output) port coupled to optical path 64. Optical path 64 may couple optical splitter 54 to a first (e.g., input) port of optical combiner 52. Optical path 62 may couple optical splitter 54 to a second (e.g., input) port of optical combiner 52. Optical combiner 52 may have a third (e.g., output) port coupled to optical path 40.

An optical phase shifter such as optical phase shifter 80 may be (optically) interposed on or along optical path 64. An optical modulator such as optical modulator 56 may be (optically) interposed on or along optical path 62. Optical modulator 56 may be, for example, a Mach-Zehnder modulator (MZM) and may therefore sometimes be referred to herein as MZM 56. MZM 56 includes a first optical arm (branch) 60 and a second optical arm (branch) 58 interposed in parallel along optical path 62. Propagating optical local oscillator signal LO2 along arms 60 and 58 of MZM 56 may, in the presence of a voltage signal applied to one or both arms, allow different optical phase shifts to be imparted on each arm before recombining the signal at the output of the MZM (e.g., where optical phase modulations produced on the arms are converted to intensity modulations at the output of MZM 56). When the voltage applied to MZM 56 includes wireless data, MZM 56 may modulate the wireless data onto optical local oscillator signal LO2. If desired, the phase shifting performed at MZM 56 may be used to perform beam forming/steering in addition to or instead of optical phase shifter 80. MZM 56 may receive one or more bias voltages $W_{BIAS}$ (sometimes referred to herein as bias signals $W_{BIAS}$) applied to one or both of arms 58 and 60. Control circuitry 14 (FIG. 1) may provide bias voltage $W_{BIAS}$ with different magnitudes to place MZM 56 into different operating modes (e.g., operating modes that suppress optical carrier signals, operating modes that do not suppress optical carrier signals, etc.).

Intermediate frequency signal path 44 may couple UTC PD 42 to MZM 56 (e.g., arm 60). An amplifier such as low noise amplifier 82 may be interposed on intermediate frequency signal path 44. Intermediate frequency signal path 44 may be used to pass intermediate frequency signals SIGIF from UTC PD 42 to MZM 56. DAC 74 may have an input coupled to up-conversion circuitry, modulator circuitry, and/or baseband circuitry in a transmitter of transceiver circuitry 26. DAC 74 may receive digital data to transmit over antenna 30 and may convert the digital data to the analog domain (e.g., as data DAT). DAC 74 may have an output coupled to transmit data path 78. Transmit data path 78 may couple DAC 74 to MZM 56 (e.g., arm 60). Each of the components along signal path 28 may allow the same antenna 30 to both transmit THF signals 32 and receive THF signals 34 (e.g., using the same components along signal path 28), thereby minimizing space and resource consumption within device 10.

LO light sources 70 may produce (emit) optical local oscillator signals LO1 and LO2 (e.g., at different wavelengths that are separated by the wavelength of THF signals 32/34). Optical components 68 may include lenses, waveguides, optical couplers, optical fibers, and/or other optical components that direct the emitted optical local oscillator signals LO1 and LO2 towards optical splitter 54 via optical path 66. Optical splitter 54 may split the optical signals on optical path 66 (e.g., by wavelength) to output optical local oscillator signal LO1 onto optical path 64 while outputting optical local oscillator signal LO2 onto optical path 62.

Control circuitry 14 (FIG. 1) may provide phase control signals CTRL to optical phase shifter 80. Phase control signals CTRL may control optical phase shifter 80 to apply optical phase shift S to the optical local oscillator signal LO1 on optical path 64. Phase shift S may be selected to steer a signal beam of THF signals 32/34 in a desired pointing direction. Optical phase shifter 80 may pass the phase-shifted optical local oscillator signal LO1 (denoted as LO1+S) to optical combiner 52. Signal beam steering is performed in the optical domain (e.g., using optical phase shifter 80) rather than in the THF domain because there are no satisfactory phase shifting circuit components that operate at frequencies as high as the frequencies of THF signals 32 and 34. Optical combiner 52 may receive optical local oscillator signal LO2 over optical path 62. Optical combiner 52 may combine optical local oscillator signals LO1 and LO2 onto optical path 40, which directs the optical local oscillator signals onto UTC PD 42 for use during signal transmission or reception.

During transmission of THF signals 32, DAC 74 may receive digital wireless data (e.g., data packets, frames, symbols, etc.) for transmission over THF signals 32. DAC 74 may convert the digital wireless data to the analog domain and may output (transmit) the data onto transmit data path 78 as data DAT (e.g., for transmission via antenna 30). Power amplifier 76 may amplify data DAT. Transmit data path 78 may pass data DAT to MZM 56 (e.g., arm 60). MZM 56 may modulate data DAT onto optical local oscillator signal LO2 to produce modulated optical local oscillator signal LO2' (e.g., an optical local oscillator signal at the frequency/wavelength of optical local oscillator signal LO2 but that is modulated to include the data identified by data DAT). Optical combiner 52 may combine optical local oscillator signal LO1 with modulated optical local oscillator signal LO2' at optical path 40.

Optical path 40 may illuminate UTC PD 42 with (using) optical local oscillator signal LO1 (e.g., with the phase shift S applied by optical phase shifter 80) and modulated optical local oscillator signal LO2'. Control circuitry 14 (FIG. 1) may apply a control signal $V_{BIAS}$ to UTC PD 42 that configures antenna 30 for the transmission of THF signals 32. UTC PD 42 may convert optical local oscillator signal LO1 and modulated optical local oscillator signal LO2' into antenna currents on radiating element arm(s) 36 at the frequency of THF signals 32 (e.g., while programmed for transmission using control signal $V_{BIAS}$). The antenna currents on radiating element arm(s) 36 may radiate THF signals 32. The frequency of THF signals 32 is given by the difference in frequency between optical local oscillator signal LO1 and modulated optical local oscillator signal LO2'. Control signals $V_{BIAS}$ may control UTC PD 42 to preserve the modulation from modulated optical local oscillator signal LO2' in the radiated THF signals 32. External equipment that receives THF signals 32 will thereby be able to extract data DAT from the THF signals 32 transmitted by antenna 30.

During reception of THF signals 34, MZM 56 does not modulate any data onto optical local oscillator signal LO2. Optical path 40 therefore illuminates UTC PD 42 with optical local oscillator signal LO1 (e.g., with phase shift S) and optical local oscillator signal LO2. Control circuitry 14 (FIG. 1) may apply a control signal $V_{BIAS}$ (e.g., a bias voltage) to UTC PD 42 that configures antenna 30 for the receipt of THF signals 32. UTC PD 42 may use optical local oscillator signals LO1 and LO2 to convert the received THF signals 34 into intermediate frequency signals SIGIF output onto intermediate frequency signal path 44 (e.g., while programmed for reception using bias voltage $V_{BIAS}$). Intermediate frequency signals SIGIF may include the modulated data from the received THF signals 34. Low noise amplifier 82 may amplify intermediate frequency signals SIGIF, which are then provided to MZM 56 (e.g., arm 60). MZM 56 may convert intermediate frequency signals SIGIF to the optical domain as optical signals LOrx (e.g., by modulating the data in intermediate frequency signals SIGIF onto one of the optical local oscillator signals) and may pass the optical signals to optical receiver 72 in optical components 68, as shown by arrow 63 (e.g., via optical paths 62 and 66 or other optical paths). Control circuitry 14 (FIG. 1) may use optical receiver 72 to convert optical signals LOrx to other formats and to recover (demodulate) the data carried by THF signals 34 from the optical signals. In this way, the same antenna 30 and signal path 28 may be used for both the transmission and reception of THF signals while also performing beam steering operations.

The example of FIG. 6 in which intermediate frequency signals SIGIF are converted to the optical domain is merely illustrative. If desired, transceiver circuitry 26 may receive and demodulate intermediate frequency signals SIGIF without first passing the signals to the optical domain. For example, transceiver circuitry 26 may include an analog-to-digital converter (ADC), intermediate frequency signal path 44 may be coupled to an input of the ADC rather than to MZM 56, and the ADC may convert intermediate frequency signals SIGIF to the digital domain. As another example, intermediate frequency signal path 44 may be omitted and control signals $V_{BIAS}$ may control UTC PD 42 to directly sample THF signals 34 with optical local oscillator signals LO1 and LO2 to the optical domain. As an example, UTC PD 42 may use the received THF signals 34 and control signals $V_{BIAS}$ to produce an optical signal on optical path 40. The optical signal may have an optical carrier with sidebands that are separated from the optical carrier by a fixed frequency offset (e.g., 30-100 GHz, 60 GHz, 50-70 GHz, 10-100 GHz, etc.). The sidebands may be used to carry the modulated data from the received THF signals 34. Signal path 28 may direct (propagate) the optical signal produced by UTC PD 42 to optical receiver 72 in optical components 68 (e.g., via optical paths 40, 64, 62, 66, 63, and/or other optical paths). Control circuitry 14 (FIG. 1) may use optical receiver 72 to convert the optical signal to other formats and to recover (demodulate) the data carried by THF signals 34 from the optical signal (e.g., from the sidebands of the optical signal).

Figure 7:
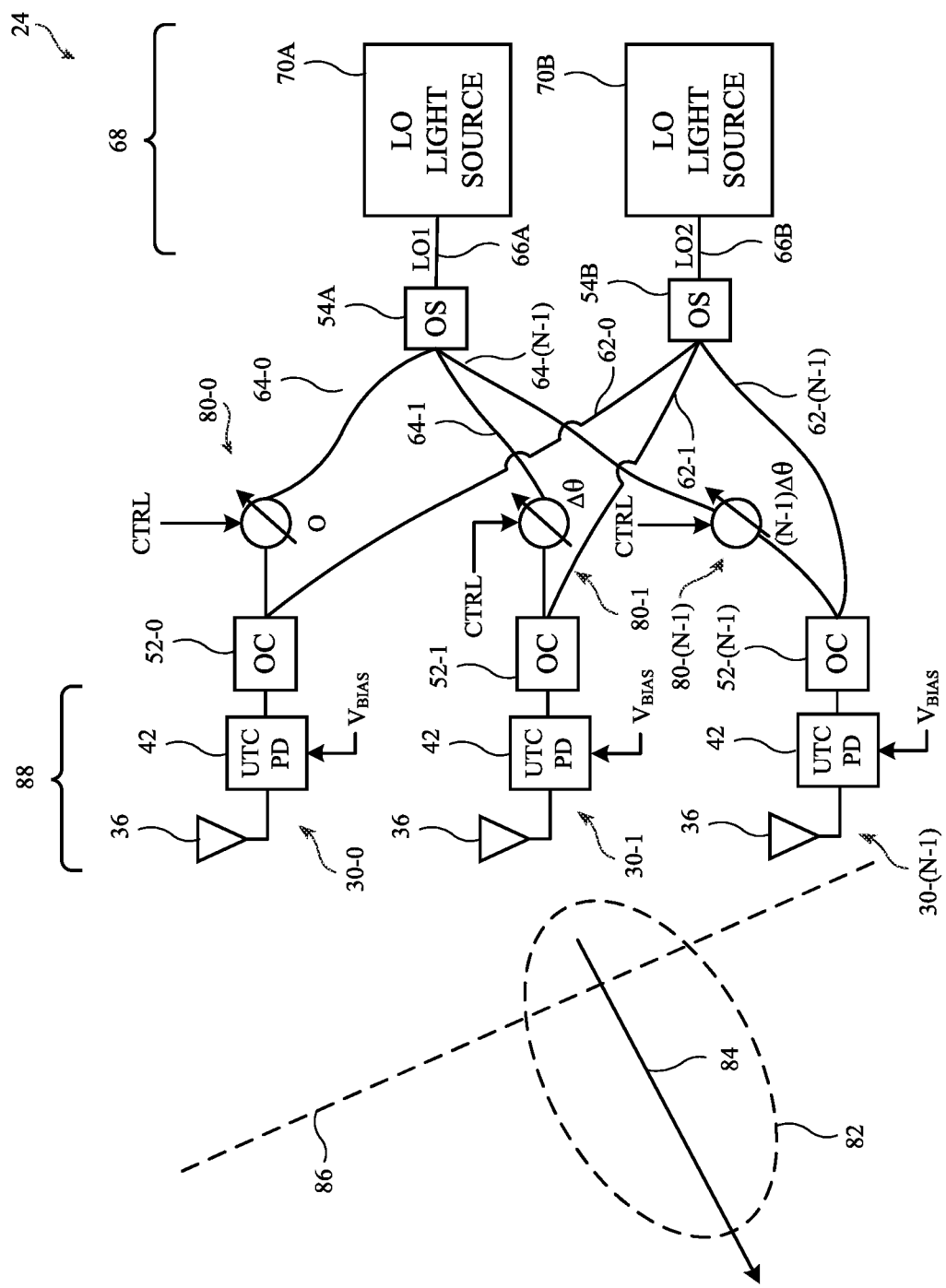
FIG. 7 is a circuit diagram of an illustrative phased antenna array that conveys wireless signals at frequencies greater than about 100 GHz within a corresponding signal beam in accordance with some embodiments.

FIG. 7 is a circuit diagram showing one example of how multiple antennas 30 may be integrated into a phased antenna array 88 that conveys THF signals over a corresponding signal beam. In the example of FIG. 7, MZMs 56, intermediate frequency signal paths 44, data paths 78, and optical receiver 72 of FIG. 6 have been omitted for the sake of clarity. Each of the antennas in phased antenna array 88 may alternatively sample received THF signals directly into the optical domain or may pass intermediate frequency signals SIGIF to ADCs in transceiver circuitry 26.

As shown in FIG. 7, phased antenna array 88 includes N antennas 30 such as a first antenna 30-0, a second antenna 30-1, and an Nth antenna 30-(N−1). Each of the antennas 30 in phased antenna array 88 may be coupled to optical components 68 via a respective optical signal path (e.g., optical signal path 28 of FIG. 6). Each of the N signal paths may include a respective optical combiner 52 coupled to the UTC PD 42 of the corresponding antenna 30 (e.g., the UTC PD 42 in antenna 30-0 may be coupled to optical combiner 52-0, the UTC PD 42 in antenna 30-1 may be coupled to optical combiner 52-1, the UTC PD 42 in antenna 30-(N−1) may be coupled to optical combiner 52-(N−1), etc.). Each of the N signal paths may also include a respective optical path 62 and a respective optical path 64 coupled to the corresponding optical combiner 52 (e.g., optical paths 64-0 and 62-0 may be coupled to optical combiner 52-0, optical paths 64-1 and 62-1 may be coupled to optical combiner 52-1, optical paths 64-(N−1) and 62-(N−1) may be coupled to optical combiner 52-(N−1), etc.).

Optical components 68 may include LO light sources 70 such as a first LO light source 70A and a second LO light source 70B. The optical signal paths for each of the antennas 30 in phased antenna array 88 may share one or more optical splitters 54 such as a first optical splitter 54A and a second optical splitter 54B. LO light source 70A may generate (e.g., produce, emit, transmit, etc.) first optical local oscillator signal LO1 and may provide first optical local oscillator signal LO1 to optical splitter 54A via optical path 66A. Optical splitter 54A may distribute first optical local oscillator signal LO1 to each of the UTC PDs 42 in phased antenna array 88 over optical paths 64 (e.g., optical paths 64-0, 64-1, 64-(N−1), etc.). Similarly, LO light source 70B may generate (e.g., produce, emit, transmit, etc.) second optical local oscillator signal LO2 and may provide second optical local oscillator signal LO2 to optical splitter 54B via optical path 66B. Optical splitter 54B may distribute second optical local oscillator signal LO2 to each of the UTC PDs 42 in phased antenna array 88 over optical paths 62 (e.g., optical paths 62-0, 62-1, 62-(N−1), etc.).

A respective optical phase shifter 80 may be interposed along (on) each optical path 64 (e.g., a first optical phase shifter 80-0 may be interposed along optical path 64-0, a second optical phase shifter 80-1 may be interposed along optical path 64-1, an Nth optical phase shifter 80-(N−1) may be interposed along optical path 64-(N−1), etc.). Each optical phase shifter 80 may receive a control signal CTRL that controls the phase S provided to optical local oscillator signal LO1 by that optical phase shifter (e.g., first optical phase shifter 80-0 may impart an optical phase shift of zero degrees/radians to the optical local oscillator signal LO1 provided to antenna 30-0, second optical phase shifter 80-1 may impart an optical phase shift of $\Delta\phi$ to the optical local oscillator signal LO1 provided to antenna 30-1, Nth optical phase shifter 80-(N−1) may impart an optical phase shift of $(N-1)\Delta\phi$ to the optical local oscillator signal LO1 provided to antenna 30-(N−1), etc.). By adjusting the phase S imparted by each of the N optical phase shifters 80, control circuitry 14 (FIG. 1) may control each of the antennas 30 in phased antenna array 88 to transmit THF signals 32 and/or to receive THF signals 34 within a formed signal beam 83. Signal beam 83 may be oriented in a particular beam pointing direction (angle) 84 (e.g., the direction of peak gain of signal beam 83). The THF signals conveyed by phased antenna array 88 may have wavefronts 86 that are orthogonal to beam pointing direction 84. Control circuitry 14 may adjust beam pointing direction 84 over time to point towards external communications equipment or an external object or to point away from external objects, as examples.

Phased antenna array 88 may be operable in an active mode in which the array transmits and/or receives THF signals using optical local oscillator signals LO1 and LO2 (e.g., using phase shifts provided to each antenna element to steer signal beam 83). If desired, phased antenna array 88 may also be operable in a passive mode in which the array does not transmit or receive THF signals. Instead, in the passive mode, phased antenna array 88 may be configured to form a passive reflector that reflects THF signals or other electromagnetic waves incident upon device 10. In the passive mode, the UTC PDs 42 in phased antenna array 88 are not illuminated by optical local oscillator signals LO1 and LO2 and transceiver circuitry 26 performs no modulation/demodulation, mixing, filtering, detection, modulation, and/or amplifying of the incident THF signals. While in the passive mode, control signals $V_{BIAS}$ may be used to control each antenna 30 to impart one or more selected phase shifts, carrier frequency shifts, and/or polarization changes in the process of reflecting the incident electromagnetic waves. Phased antenna array 88 may sometimes be referred to as an intelligent reflecting surface (IRS) when placed in the passive mode and when controlled/programmed to apply one or more phase shifts, carrier frequency shifts, and/or polarization changes to the reflected electromagnetic waves. The carrier frequency shifts may be from a given carrier frequency $f_c$ to $2*f_c$ or other frequencies or vice versa, for example. The polarization changes may be changes from vertical to horizontal linear polarizations, from horizontal to vertical linear polarizations, to or from orbital-angular-momentum (OAM) configurations, etc. Any desired combination of polarization, frequency, and phase changes may be used.

Figure 8:
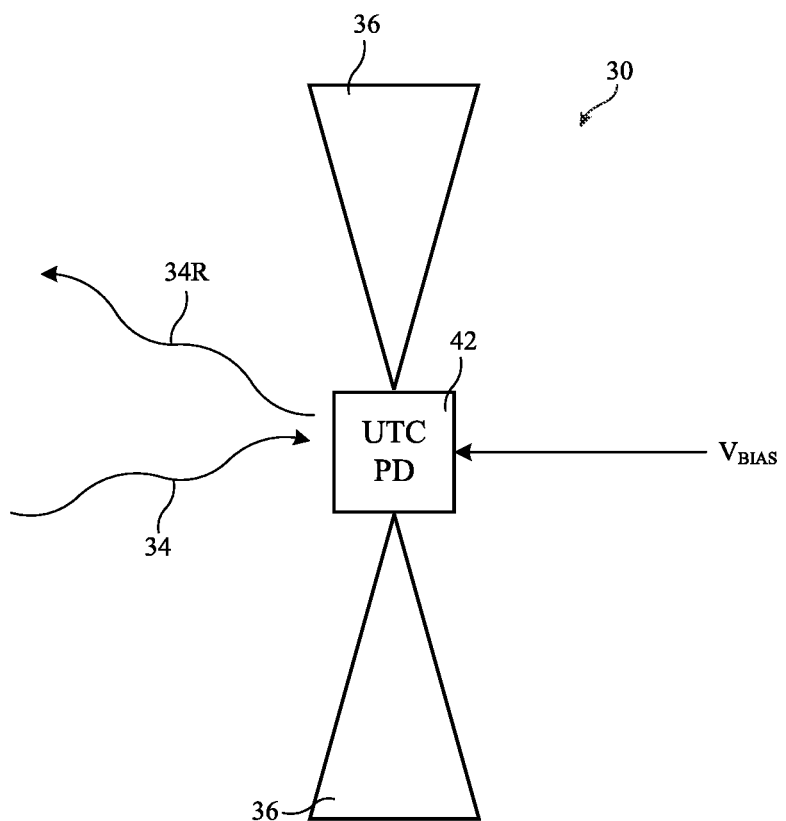
FIG. 8 is a top view showing how an illustrative antenna of the type shown in FIGS. 2 and 3 may be controlled to passively reflect wireless signals at frequencies greater than about 100 GHz while imparting the reflected wireless signals with a desired phase and/or frequency change in accordance with some embodiments.

FIG. 8 is a diagram of a given antenna 30 in phased antenna array 88 that may be configured to reflect electromagnetic waves while phased antenna array 88 is placed in the passive mode. As shown in FIG. 8, in the passive mode, UTC PD 42 is not supplied with optical local oscillator signals. Control signals $V_{BIAS}$ may include a bias voltage and/or other control signals that configure UTC PD 42 to exhibit a selected output impedance. The selected output impedance may be mismatched with respect to the input impedance of antenna radiating element arms 36 (e.g., at the frequencies of THF signals 34). This impedance mismatch may cause antenna 30 to reflect (scatter) incident THF signals 34 as reflected THF signals 34R (sometimes referred to herein simply as reflected signals 34R).

The selected impedance mismatch may also configure antenna 30 to impart a selected phase shift and/or carrier frequency shift on reflected signals 34R relative to the incident THF signals 34 (e.g., where reflected signals 34R are phase-shifted with respect to THF signals 34 by the selected phase shift, are frequency-shifted with respect to THF signals 34 by the selected carrier frequency shift, etc.). Additionally or alternatively, the system may be adapted to configure antenna(s) 30 to impart polarization changes on reflected signals 34R relative to the incident THF signals 34. Control signals $V_{BIAS}$ may change, adjust, or alter the output impedance of UTC PD 42 over time to change the amount of mismatch between the output impedance of UTC PD 42 and the input impedance of antenna radiating element arms 36 to impart reflected signals 34R with different phase shifts and/or carrier frequency shifts. In other words, control circuitry 14 may program the phase, frequency, and/or polarization characteristics of reflected signals 34R (e.g., using the control signals $V_{BIAS}$ applied to UTC PD 42).

The same impedance mismatch may be applied to all the antennas 30 in phased antenna array 88 or different impedance mismatches may be applied for different antennas 30 in phased antenna array 88 at any given time. Applying different impedance mismatches across phased antenna array 88 may, for example, allow control circuitry 14 to perform space-time coding on the reflected signals 34R (e.g., in which the spatial response and/or the temporal response of reflected signals 34R are encoded to convey information to external equipment that receives reflected signals 34R) and/or to form a signal beam of reflected signals 34R that points in one or more desired beam pointing directions. When phased antenna array 88 is operated in the active mode, control circuitry 14 may control LO light sources 70 to illuminate the UTC PDs 42 in phased antenna array 88 using optical local oscillator signals LO1 and LO2 and control signals $V_{BIAS}$ may be adjusted to configure UTC PD 42 to cause antenna radiating element arms 36 to radiate THF signals 32 or to receive THF signals 34 (e.g., as shown in FIGS. 2 and 3).

Figure 9:
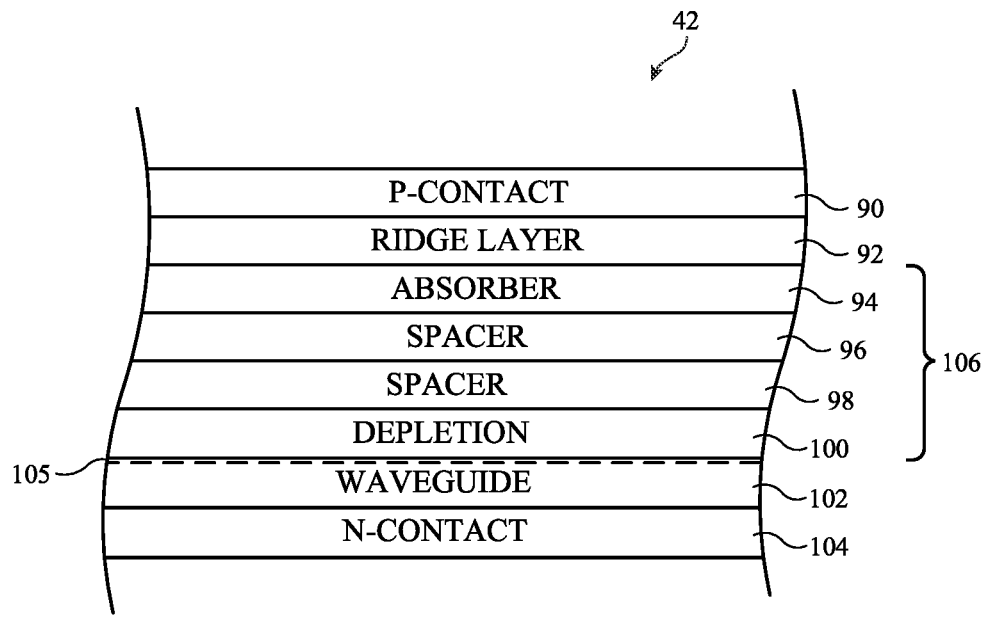
FIG. 9 is a cross-sectional side view of an illustrative uni-travelling-carrier photodiode (UTC PD) in an antenna that can be configured to transmit, receive, and/or passively reflect wireless signals at frequencies greater than about 100 GHz in accordance with some embodiments.

FIG. 9 is a cross-sectional side view of a given UTC PD 42 in phased antenna array 88. As shown in FIG. 9, UTC PD 42 may include multiple stacked layers (e.g., in a semiconductor substrate). The stacked layers of UTC PD 42 may include an n-type contact layer 104 and a p-type contact layer 90 (e.g., on opposing sides of the stack). N-type contact layer 104 may include n-type doped indium phosphide (InP), as an example. A waveguide layer such as waveguide 102 may be stacked (layered) on n-type contact layer 104. A depletion layer such as depletion layer 100 may be stacked on waveguide 102. Depletion layer 100 may include n-type doped InP, as an example. One or more spacer layers such as spacer layers 96 and 98 may be stacked on depletion layer 100. An absorber layer such as absorber layer 94 may be stacked on spacer layer 96. Absorber layer 94 may include p-type doped indium gallium arsenide (InGaAs), as an example. A ridge layer such as ridge layer 92 may be stacked on absorber layer 94. Ridge layer 92 may include p-type doped InP, as an example. P-type contact layer 90 may be stacked on ridge layer 92. P-type contact layer 90 may include InGaAs, as an example. Control signals $V_{BIAS}$ may be applied to (across) p-type contact layer 90 and n-type contact layer 104 to control the operation of UTC PD 42. Control signals $V_{BIAS}$ may adjust the output impedance of UTC PD 42 and/or may configure UTC PD 42 to transmit THF signals 32 and/or receive THF signals 34.

The example of FIG. 9 is merely illustrative. Antennas 30 need not include UTC PDs and, if desired, UTC PD 42 may be replaced by a PIN diode (e.g., a PIN photodiode) or any other desired programmable diode structure. The layers of UTC PD 42 may be stacked in other orders (e.g., waveguide 102 may be interposed between other layers, etc.). Additional layers may be included in the stack. For example, a graphene layer such as graphene sublayer 105 may be layered onto waveguide 102 or may otherwise be layered under antenna radiating element arms 36 (FIG. 8). Graphene sublayer 105 may, for example, serve to extend the frequency range of antenna 30 for the transmission/reception of THF signals and/or for the passive reflection of THF signals 34 as reflected signals 34R.

Figure 10:
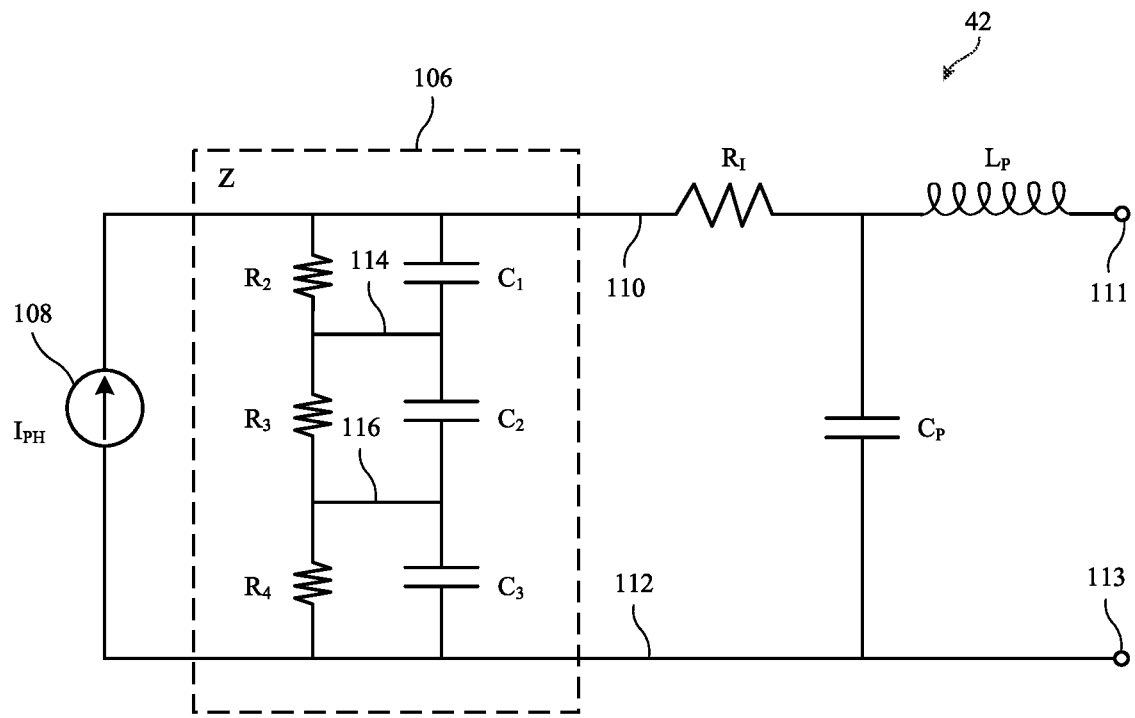
FIG. 10 is an equivalent circuit diagram of an illustrative UTC PD in an antenna that can be configured to transmit, receive, and/or passively reflect wireless signals at frequencies greater than about 100 GHz in accordance with some embodiments.

FIG. 10 is an equivalent circuit diagram of UTC PD 42. As shown in FIG. 10, UTC PD 42 may include an impedance matching portion (region) 106 coupled between lines 110 and 112. Impedance matching portion 106 may be formed from layers 94-100 of FIG. 9, for example. Line 110 may couple terminal 111 to a first terminal of current source 108. Line 112 may couple terminal 113 to a second terminal of current source 108. Antenna radiating element arms 36 (FIG. 8) may be coupled between terminals 111 and 113.

A first resistance $R_1$ may be interposed on line 110 between impedance matching portion 106 and terminal 111. A parasitic inductance $L_P$ may be interposed on line 110 in series between resistance $R_1$ and terminal 111. A parasitic capacitance $C_P$ may be coupled between a node on line 110 between resistance $R_1$ and parasitic inductance $L_P$ and a node on line 112 between impedance matching portion 106 and terminal 113.

Impedance matching portion 106 may include resistances $R_2$, $R_3$, and $R_4$ coupled in series between lines 110 and 112. Impedance matching portion 106 may include capacitances $C_1$, $C_2$, and $C_3$ coupled in series between lines 110 and 112 (and in parallel with resistances $R_2$, $R_3$, and $R_4$). A path 114 in impedance matching portion 106 may couple a node between resistances $R_2$ and $R_3$ to a node between capacitances $C_1$ and $C_2$. A path 116 in impedance matching portion 106 may couple a node between resistances $R_3$ and $R_4$ to a node between capacitances $C_2$ and $C_3$. Impedance matching portion 106 may also be simplified as a single capacitance coupled between lines 110 and 112 or as a single capacitance and a single resistance (e.g., a resistance across depletion layer 100) coupled in parallel between lines 110 and 112.

Current source 108 may produce a photocurrent $I_{PH}$ between lines 110 and 112 in response to illumination from optical local oscillator signals LO1 and LO2. Photocurrent $I_{PH}$ may run along the antenna radiating element arms (e.g., between terminals 111 and 113) to radiate THF signals 32. Impedance matching portion 106 may be configured to exhibit the output impedance Z of UTC PD 42. Control signals $V_{BIAS}$ (e.g., one or more bias voltages and/or other control signals) may be applied to P-type contact layer 90 and N-type contact layer 104 (FIG. 9) to vary one or more of resistances $R_2$, $R_3$, and/or $R_4$ and/or to vary one or more of capacitances $C_1$, $C_2$, and/or $C_3$, thereby serving to adjust the output impedance Z of UTC PD 42.

For example, when the antenna is transmitting or receiving THF signals in the active mode, control signals $V_{BIAS}$ may configure impedance matching portion 106 to match output impedance Z to the input impedance of the antenna radiating element arms coupled across terminals 111 and 113. However, when the antenna is in the passive mode, control signals $V_{BIAS}$ may configure impedance matching portion 106 to exhibit an output impedance Z that differs from (mismatches) the input impedance of the antenna radiating element arms by a selected amount. The amount of mismatch may be selected to impart a selected phase shift and/or carrier frequency shift (e.g., by antenna 30 on its own or in conjunction with other antennas 30 in the phased antenna array) when reflecting incident THF signals 34 as reflected signals 34R. Control signals $V_{BIAS}$ may adjust output impedance Z to adjust the (selected) amount of mismatch between output impedance Z and the input impedance of the antenna radiating element arms over time (e.g., to adjust the phase shift and/or carrier frequency shift imparted by antenna 30 on its own or in conjunction with other antennas 30 when reflecting incident THF signals 34 as reflected signals 34R).

Figure 11:
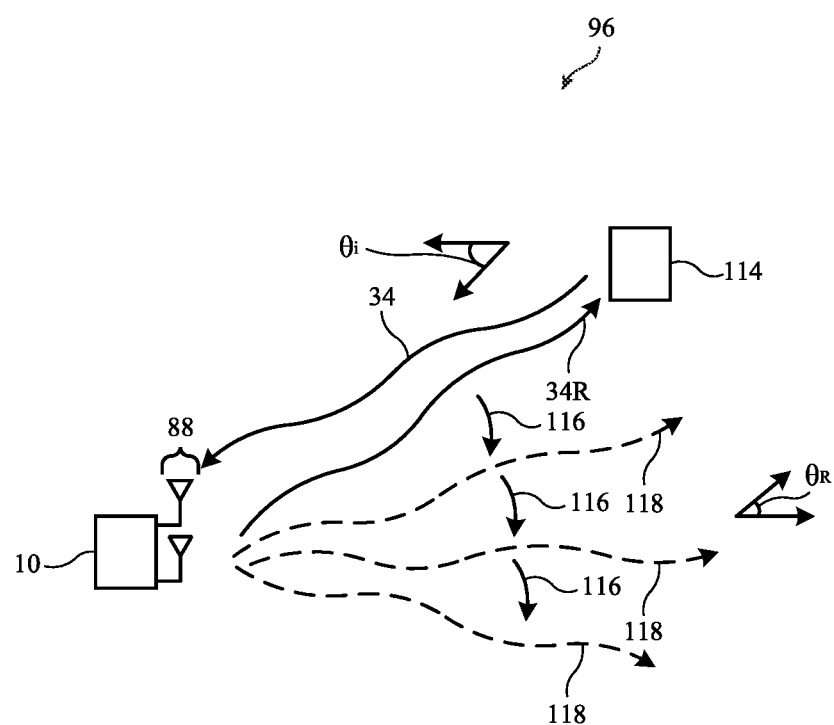
FIG. 11 is a diagram showing how illustrative antennas on an electronic device may passively reflect wireless signals transmitted by external communications equipment in different directions in accordance with some embodiments.

FIG. 11 is a diagram showing how one or more antennas 30 on device 10 (e.g., phased antenna array 88) may reflect incident THF signals. As shown in FIG. 11, a communications network or system 96 may include device 10 and external communications equipment such as external equipment 114. External equipment 114 may be another device such as device 10, a wireless base station, a wireless access point, a peripheral device, an accessory device, a user input device, etc.

As shown in FIG. 11, external equipment 114 may transmit THF signals 34. THF signals 34 may be incident upon device 10 at incident angle $\theta_i$. When configured in the passive mode, one or more of the antennas 30 in phased antenna array 88 may reflect the THF signals 34 at incident angle 9 as reflected signals 34R. Control signals $V_{BIAS}$ may be varied (e.g., thereby varying imparted phase shift) across phased antenna array 88 to configure array 88 to collectively reflect THF signals 34 from incident angle $\theta_i$ onto a corresponding output (scattered) angle $\theta_R$ (e.g., as a reflected signal beam with a beam pointing direction in the direction of output angle $\theta_R$).

Control signals $V_{BIAS}$ may configure output angle $\theta_R$ to be any desired angle. For example, output angle $\theta_R$ may be oriented towards external equipment 114 so external equipment 114 receives reflected signals 34R. This may allow external equipment 114 to locate the position of device 10 (e.g., in situations where external equipment 114 has no a priori knowledge of the location of device 10) and/or to receive information from device 10 that has been encoded in the reflected signals. In scenarios where external equipment 114 locates the position of device 10 based on the receipt of reflected signals 34R, external equipment 114 may use the known position of device 10 to perform further wireless communications with device 10 using THF signals (e.g., by steering a signal beam of THF signals 34 towards the known location of device 10 for subsequent communications).

If desired, control circuitry 14 (FIG. 1) may further adjust the phase shifts and/or frequency shifts imparted by one or more of the antennas in phased antenna array 88 as a function of space and/or as a function of time to perform space-time coding that encodes information to be received by external equipment 114 within reflected signals 34R. Such space-time coding may involve control signals $V_{BIAS}$ provided to each of the antennas 30 in phased antenna array 88 that configure each antenna 30 to produce, by reflecting/scattering incident THF signals 34, reflected signals 34R having respective phase shifts (e.g., with a range from −180 degrees to 180 degrees or some subset thereof), amplitudes, and/or frequency shifts, at each antenna 30 in the array at different times. Control circuitry 14 may, for example, switch the UTC PD control signals $V_{BIAS}$ at a sufficiently high rate such as at a rate that matches or exceeds the sample rate and/or that matches or exceeds the symbol rate of external equipment 114. Collectively, over time and space, the reflected signals 34R may encode any desired information for receipt and decoding by external equipment 114 and/or any other desired external communications equipment. The information may include, for example, information identifying the portion or subset of device 10 that reflected THF signals 34, a device identifier that identifies device 10 and/or a user of device 10, application data, messages, control data, configuration data, etc.

If desired, control circuitry 14 may control output angle $\theta_R$ to point in other directions, as shown by arrows 118.

Arrows 118 may be oriented towards other external communications equipment if desired. The other external communications equipment may identify a location of device 10 based on receipt of reflected signals 34R and/or may identify any other information transmitted via the reflected signals (e.g., using space-time coding). If desired, control circuitry 14 may sweep reflected signals 34R over a number of different output angles $\theta_R$ as a function of time, as shown by arrows 116. This may, for example, help device 10 to find other external communications equipment for performing subsequent THF communications (e.g., to identify the location of other external communications equipment for performing further THF communications).

If desired, control circuitry 14 may spread the reflected signals 34R as much as possible across all available directions (e.g., as shown by arrows 118) in any desired sequence (e.g., a random or pseudorandom sequence) to reduce the radar cross section of device 10. This may, for example, help to preserve the privacy of device 10 by hiding the presence or precise location of device 10 relative to the rest of system 96. If desired, control circuitry 14 may adjust control signals $V_{BIAS}$ to maximize the amount of electromagnetic energy from THF signals 34 that are absorbed at device 10 rather than reflected as reflected signals 34R. Such absorption may be used to thermally heat device 10, for example. If desired, phased antenna array 88 may configure device 10 to form a cooperative device in a radar system. When acting as a cooperative device, THF signals 34 are spatial ranging signals such as radar signals and control circuitry 14 may use reflected signals 34R to inform the transmitter of THF signals 34 that a user is present at or adjacent to device 10. This may, for example, help the transmitter of THF signals 34 to be aware of a potential hazard due to the presence of the user (e.g., in scenarios where the transmitter is implemented on an automotive vehicle or other potential hazard to pedestrians or users of device 10).

Figure 12:
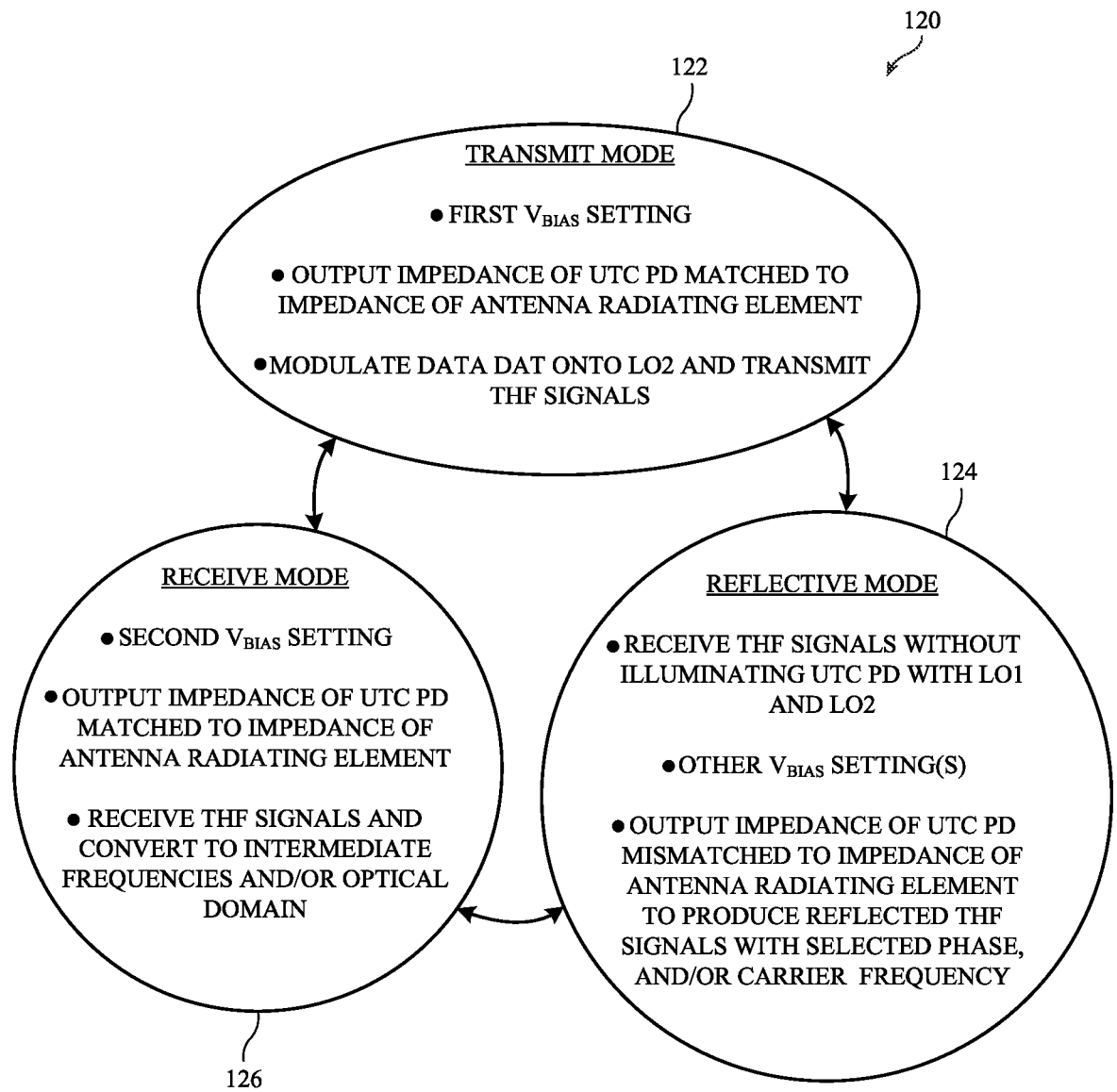
FIG. 12 is a state diagram showing illustrative operating modes for a phased antenna array that can be configured to transmit, receive, and/or passively reflect wireless signals at frequencies greater than about 100 GHz in accordance with some embodiments.

FIG. 12 shows a state diagram 120 of illustrative operating modes (states) for device 10 and one or more antennas 30 on device 10 such as antennas 30 that are integrated into a phased antenna array such as phased antenna array 88. Control circuitry 14 (FIG. 1) can adjust/transition device 10 between the states of state diagram 120 by adjusting LO light sources 70 and the control signals $V_{BIAS}$ provided to antenna(s) 30.

In transmit mode (state) 122, control circuitry 14 may provide (assert/supply) control signals $V_{BIAS}$ to antenna(s) 30 with a first setting. This may, for example, include providing antenna(s) 30 with a first bias voltage. Control signals $V_{BIAS}$ may configure impedance matching portion 106 of the UTC PD 42 in antenna(s) 30 to exhibit an output impedance that matches the input impedance of the antenna radiating element arms 36 in the antennas. This may serve to maximize the power transfer and the efficiency with which the antennas transmit THF signals. At the same time, LO light sources 70 may produce optical local oscillator signals LO1 and LO2. MZM 56 may modulate wireless data DAT (FIG. 6) onto optical local oscillator signal LO2 to produce modulated optical local oscillator signal LO2'. The UTC PD 42 in antenna(s) 30 may be illuminated using optical local oscillator signal LO1 and modulated optical local oscillator signal LO2'. Antenna(s) 30 may radiate (transmit) corresponding THF signals 32 (FIG. 6). If desired, optical phase shifters 80 may apply phase shifts to first optical local oscillator LO1 to cause the antennas to transmit THF signals 32 within a signal beam 83 oriented (formed) in a selected beam pointing direction 84 (FIG. 7).

In receive mode (state) 126, control circuitry 14 may provide (assert/supply) control signals $V_{BIAS}$ to antenna(s) 30 with a second setting. This may, for example, include providing antenna(s) 30 with a second bias voltage. Control signals $V_{BIAS}$ may configure impedance matching portion 106 of the UTC PD 42 in antenna(s) 30 to exhibit an output impedance that matches the input impedance of the antenna radiating element arms 36 in the antennas. This may serve to maximize the power transfer and the efficiency with which the antennas receive THF signals. At the same time, LO light sources 70 may illuminate the UTC PD 42 in antenna(s) 30 using optical local oscillator signals LO1 and LO2. Antenna(s) 30 may receive THF signals 34 and may convert the THF signals into intermediate frequency signals SIGIF (FIG. 6) (e.g., for conversion to the optical domain by MZM 56 or for passing to an ADC) or may sample the THF signals directly into the optical domain. A receiver in transceiver circuitry 26 may demodulate wireless data in the received signals and may pass the demodulated data up a protocol stack for further processing.

In a passive mode such as reflective mode 124 (sometimes referred to herein as passive mode 124, passive reflective mode 124, passive reflector mode 124, passive reflection mode 124, or reflection mode 124), optical local oscillator signals LO1 and LO2 do not illuminate the UTC PD 42 in antenna(s) 30 (e.g., LO light sources 70 may be disabled, inactive, or powered off, or optical switching or absorption may be used to prevent the optical local oscillator signals from illuminating UTC PD(s) 42). Antenna(s) 30 may receive incident THF signals 34 while the UTC PD(s) 42 are unilluminated. At the same time, control circuitry 14 may provide (assert/supply) control signals $V_{BIAS}$ to antenna(s) 30 with one or more settings other than the first and second settings. Control signals $V_{BIAS}$ may configure impedance matching portion 106 of the UTC PD 42 in antenna(s) 30 to exhibit one or more output impedances that do not match (i.e., that mismatch) the input impedance of the antenna radiating element arms 36 in the antennas. This may serve to reflect the THF signals 34 incident on antenna(s) 30 as reflected signals 34R.

If desired, control circuitry 14 may use control signals $V_{BIAS}$ to provide different amounts of impedance mismatch for the incident THF signals 34 at different antennas 30 and/or at different times. This may serve to impart one or more phase shifts and/or carrier frequency shifts to reflected signals 34R as a function of space and/or time. For example, different phase shifts may be produced in reflected signals 34R at different antennas 30 to form a signal beam at a selected output angle $\theta_R$ (FIG. 11), to perform space-time coding that conveys information to external communications equipment such as the transmitter of THF signals 34 or other external equipment, to scatter the reflected signals over as many directions as possible, to absorb as much of the incident THF signals 34 at device 10 as possible, to allow device 10 to form a cooperative device for a radar system, to inform the transmitter of THF signals 34 and/or other external equipment of the location and/or identity of device 10 (e.g., for use in performing subsequent communications), etc.

Control circuitry 14 may place device 10 in transmit mode 122 when device 10 has wireless data DAT to transmit. Control circuitry 14 may place device 10 in receive mode 126 when device 10 is scheduled to receive wireless data in THF signals 34, for example. Control circuitry 14 may place device 10 in reflective mode 124 when not actively transmitting or receiving THF signals. Reflective mode 124 may, for example, be a default mode for device 10. Device 10 may consume less power in reflective mode 124 than in transmit mode 122 or receive mode 126 while still being able to passively convey information to external communications equipment via reflected signals 34R.

Figure 13:
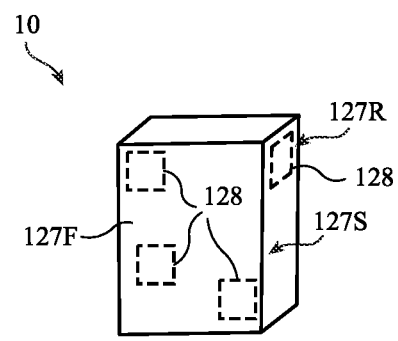
FIG. 13 is a perspective view showing how one or more antennas in one or more illustrative phased antenna arrays may be distributed across different locations on an electronic device in accordance with some embodiments.

FIG. 13 is a perspective view showing an example of how different antennas 30 may be located at different locations on device 10. In the example of FIG. 13, device 10 has a front face 127F (e.g., a front face from a display or display cover layer for device 10), a rear face 127R (e.g., a rear housing wall opposite the front face), and side faces 127S (e.g., peripheral housing structures extending from rear face 127R to front face 127F). This is merely illustrative and, in general, device 10 may have other form factors (e.g., cylindrical form factors, composite form factors, a laptop computer form factor, a desktop computer form factor, a wearable form factor such as a wristwatch form factor or a head-mounted device form factor, etc.).

As shown in FIG. 13, one or more antenna(s) may be located in one or more regions (locations) 128 on front face 127F, rear face 127R, and/or one or more side faces 127S. If desired, the antennas in different regions 128 may be integrated into one or more phased antenna arrays 88 and/or a single phased antenna array 88 may be located in one or more of regions 128. There may be zero, one, or more than one region 128 on front face 127F, rear face 127R, and side faces 127S.

If desired, device 10 may include one or more antennas 30 (e.g., one or more phased antenna arrays 88) that are operable only in transmit mode 122 and reflective mode 124 of FIG. 12 (e.g., to only transmit or reflect THF signals), that are operable only in receive mode 126 and reflective mode 124 (e.g., to only receive or reflect THF signals), that are operable in all three of transmit mode 122, receive mode 126, and reflective mode 124 (e.g., to transmit, receive, or reflect THF signals at different times), and/or that are operable only in reflective mode 124. Antennas 30 that are operable only in reflective mode 124 may be dedicated passive antennas in device 10 and need not receive optical local oscillator signals LO1 and LO2. If desired, a single array of antennas 30 may include different subsets of antennas that are operable in one, two, or all three of modes 122-126.

Figure 14:
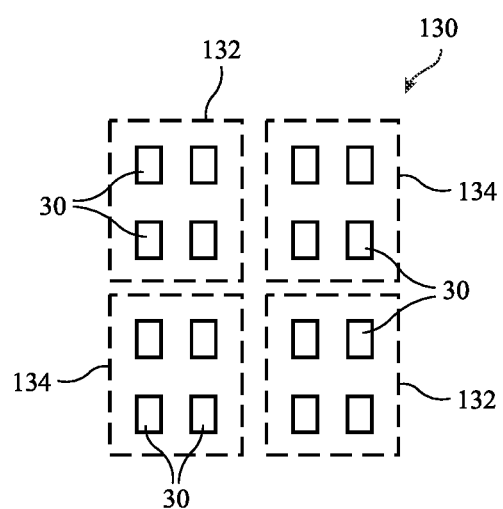
FIG. 14 is a top view of an illustrative phased antenna array having different subsets of antennas for transmitting, receiving, and/or passively reflecting wireless signals in accordance with some embodiments.

FIG. 14 is a top-down view showing how a single array of antennas 30 may include different subsets of antennas that are operable in one, two, or all three of modes 122-126. As shown in FIG. 14, device 10 may include an array 130 of antennas 30. The antennas 30 in array 130 may be integrated into a single substrate (e.g., a printed circuit board or other substrate) or may be distributed across multiple substrates. Array 130 may be located within a single region 128 or may be distributed across multiple regions 128 (FIG. 13).

Array 130 may include different subsets of antennas 30 such as subsets 132 and 134. Subsets 132 and 134 may be operable in a different number of modes 122-126. For example, one or more subsets 130 may be operable only in reflective mode 124 (e.g., subsets 130 may include passive antennas 30) or may be operable in all three of reflective modes 122-126, whereas a first subset 134 is only operable in transmit mode 122 and second subset 134 is only operable in receive mode, or subsets 134 may be operable in transmit mode 122 and receive mode 126 but not in reflective mode 124, or subsets 134 may be operable only in transmit mode 124, or subsets 134 may be operable only in receive mode 126, etc. Any desired number of antennas 30 in array 130 may form part or all of a corresponding phased antenna array 88 if desired.

The example of FIG. 14 is merely illustrative. Array 130 may include any desired number of antennas 30. There may be any desired number of subsets 134 and any desired number of subsets 132. Subsets 134 and 132 may each include any desired number of antennas 30. Each subset 134 may include the same number of antennas 30 or different subsets 134 may include different numbers of antennas 30. Each subset 132 may include the same number of antennas 30 or different subsets 132 may include different numbers of antennas 30. There may be more than two types of subsets in array 130. In the example of FIG. 14, the antennas 30 in subsets 132 are adjacent to each other and the antennas 30 in subsets 134 are adjacent to each other within array 130. In general, the antennas 30 in each subset 132 and the antennas in each subset 134 may be distributed across array 130 in any desired manner. The antennas 30 in array 130 need not be arranged in a rectangular grid pattern of rows and columns and may, in general, be arranged in any desired pattern.

Figure 15:
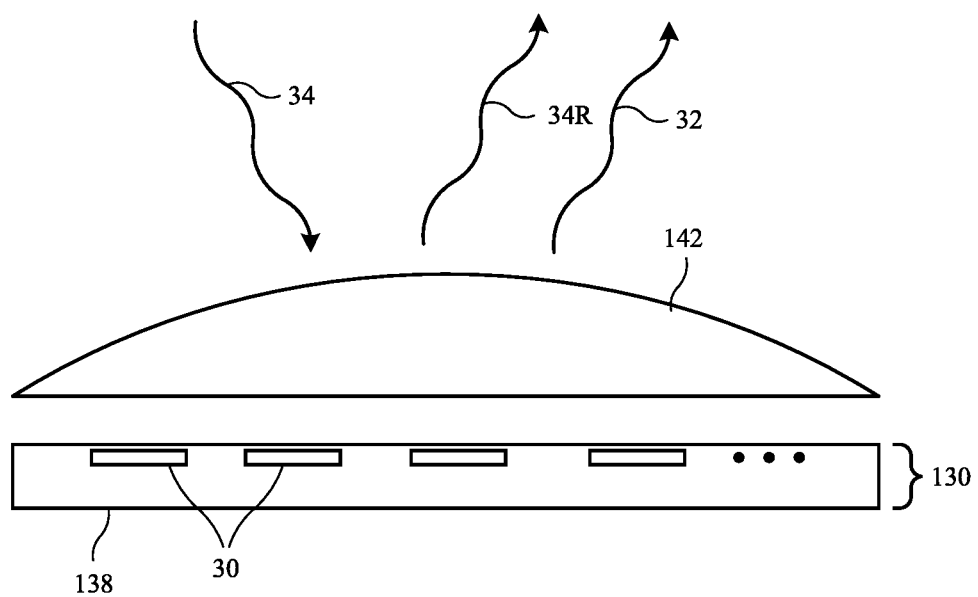
FIG. 15 is a side view showing how an illustrative THz lens may overlap a phased antenna array for focusing electromagnetic energy in accordance with some embodiments.

If desired, additional material can be provided to antenna(s) 30 to help antenna(s) 30 to focus the transmitted, reflected, and/or reflected THF signals. For example, a THz lens may be provided in device 10 to help antenna(s) 30 to focus the transmitted, received, and/or reflected THF signals. FIG. 15 is a cross-sectional side view showing one example of how device 10 may include a THz lens to help antenna(s) 30 to focus transmitted, received, and/or reflected THF signals.

As shown in FIG. 15, one or more antennas 30 (e.g., integrated within an array 130) may be disposed on or within a substrate 138. A THz lens such as THz lens 142 may be mounted on or over substrate 138. THz lens 142 may overlap at least some (e.g., all) of the antennas 30 on substrate 138. THz lens 142 may serve to focus THz signals 34 onto antennas 30, to focus transmitted THF signals 32 in a particular direction (e.g., within a corresponding signal beam), and/or to focus reflected signals 34R in a particular direction (e.g., within a corresponding signal beam). This example is merely illustrative. Multiple THz lenses may be used to focus THz signals for different antennas and/or multiple THz lenses may be used to focus THz signals for one or more antennas. THz lens 142 may have any desired shape.

Figure 16:
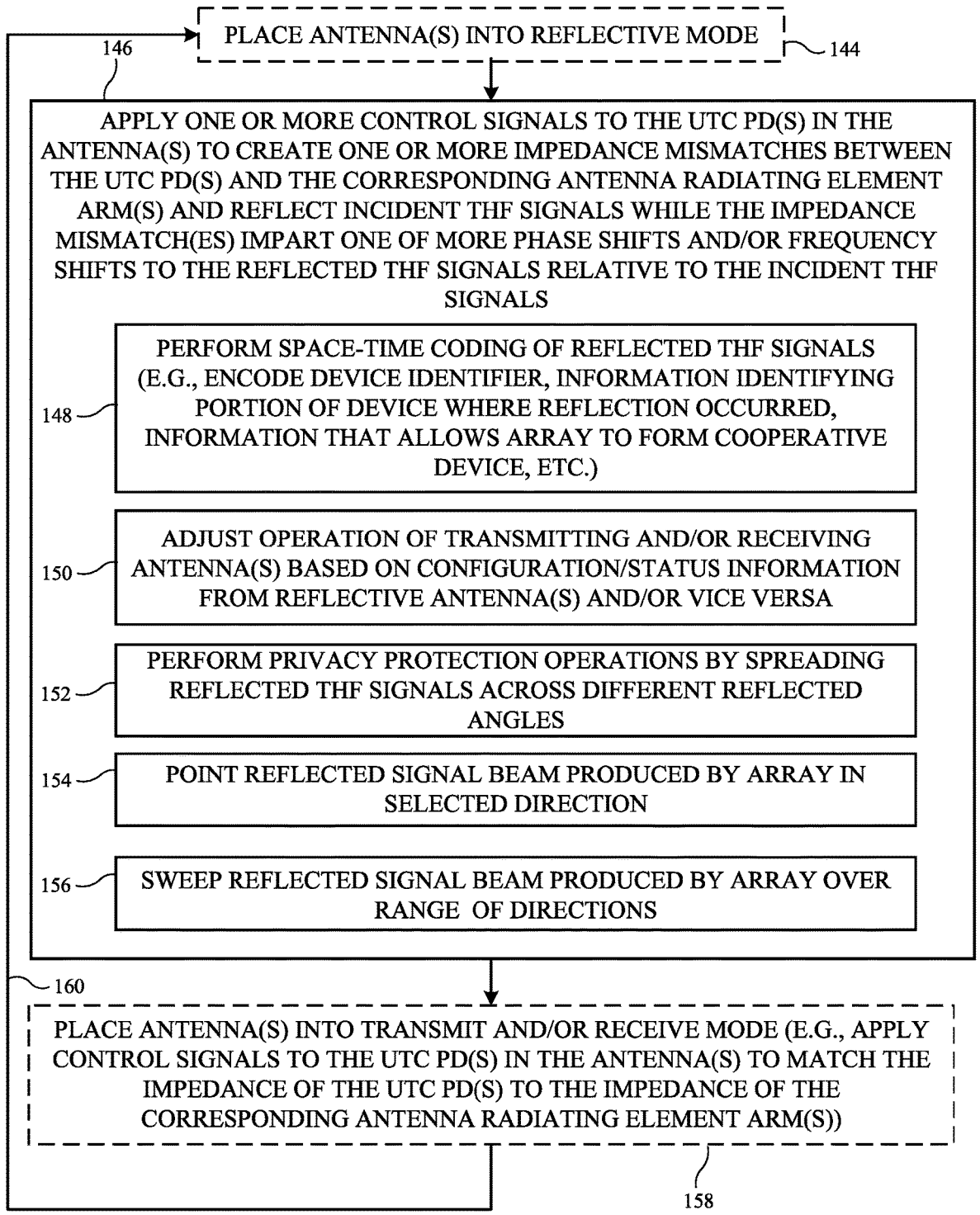
FIG. 16 is a flow chart of illustrative operations that may be performed by an illustrative electronic device in using a phased antenna array to transmit, receive, and/or passively reflect wireless signals in accordance with some embodiments.

FIG. 16 is a flow chart of illustrative operations that may be performed by control circuitry 14 (FIG. 1) in operating antenna(s) 30 to transmit, receive, and/or passively reflect THF signals. At optional operation 144, control circuitry 14 may use control signals $V_{BIAS}$ to place antenna(s) 30 into reflective mode 124 (e.g., while also controlling LO light sources 70 to stop providing optical local oscillator signals LO1 and LO2 to the antennas). Operation 144 may be omitted in examples where the antenna(s) 30 are only operable in reflective mode 124 (e.g., where the antennas are passive antennas).

At operation 146 (in reflective mode 124), control circuitry 14 may use control signals $V_{BIAS}$ to control the UTC PDs 42 in antenna(s) 30 to create one or more mismatches (e.g., a series of impedance mismatches over time) between the output impedance of the UTC PDs and the input impedance of the antenna radiating element arms 36 in antenna(s) 30. This may configure antenna(s) 30 to reflect incident THF signals 34 as reflected signals 34R. If desired, the impedance mismatch(es) may be selected and/or varied to impart one or more phase shifts and/or frequency shifts in reflected signals 34R relative to the incident THF signals 34.

If desired, control circuitry 14 may adjust the UTC PDs using control signals $V_{BIAS}$ as a function of time and/or space (e.g., across an array of antennas 30) to perform space-time coding in reflected signals 34R (at operation 148). Control circuitry 14 may, for example, encode reflected signals 34R with a device identifier that identifies device 10 and/or a user of device 10 to external communications equipment, an identifier that identifies the portion of device 10 where the reflection of THF signals 34 occurred, information that informs external communications equipment that a user of device 10 is present at the location of device 10 (e.g., for forming a cooperative device in a radar system), etc.

If desired, control circuitry 14 may adjust the operation of one or more antennas 30 that are used to transmit and/or receive THF signals based on configuration and/or status information from the antenna(s) 30 in reflective mode 124 (at operation 150). The transmitting and/or receiving antennas may include one or more of the same antennas in reflective mode 124 (e.g., antennas that will later be switched into use for THF signal transmission and/or reception) or may be different antennas from the antennas in reflective mode 124. As an example, control circuitry 14 may identify incident angle $\theta_i$ and/or output angle $\theta_R$ based on the configuration or status of the antenna(s) in reflective mode 124 that produced reflected signals 34R. The antenna(s) 30 that are subsequently used for transmission and/or reception may use the identified incident angle $\theta_i$ and/or output angle $\theta_R$ as a priori information of the location of external communications equipment for performing THF communications. Control circuitry 14 may then steer the signal beam(s) produced by those antennas to point towards the identified incident angle $\theta_i$ and/or output angle $\theta_R$. Conversely, control circuitry 14 may use information about the location of external communications equipment that is in communication with the transmitting and/or receiving antenna(s) 30 to adjust the phases produced by the antenna(s) 30 in reflective mode 124 to point towards the known location of the external communications equipment (e.g., to reflect subsequently-transmitted THF signals 34 incident from the direction of the external communications equipment). This may serve to minimize the time required to establish a THF communications link between device 10 and the external equipment.

If desired, control circuitry 14 may adjust the UTC PDs using control signals $V_{BIAS}$ as a function of time and/or space (e.g., across an array of antennas 30) to perform privacy protection operations using reflected signals 34R (at operation 152). Control circuitry 14 may, for example, adjust the phases of the UTC PDs 42 of the antenna(s) 30 in the reflective mode to spread the output angle $\theta_R$ of reflected signals 34R over as many angles as possible. This may serve to minimize the radar cross section of device 10 to THF signals, for example. Additionally or alternatively, the UTC PDs 42 may be configured to absorb as much of the incident THF signals 34 as possible (e.g., to heat device 10 using THF signals 34).

If desired, control circuitry 14 may adjust the UTC PDs using control signals $V_{BIAS}$ as a function of time and/or space (e.g., across an array of antennas 30) to form a signal beam of reflected signals 34R that is oriented in a selected output angle $\theta_R$ (at operation 154). Output angle $\theta_R$ may be selected to point towards the external communications equipment that transmitted THF signals 34 or towards other external communications equipment. This may allow device 10 to convey information in reflected signals 34R to the external communications equipment and/or may allow the external communications equipment to locate device 10 (e.g., for directing THF signals towards device 10 for subsequent THF communications).

If desired, control circuitry 14 may adjust the UTC PDs 42 using control signals $V_{BIAS}$ as a function of time and/or space (e.g., across an array of antennas 30) to sweep the signal beam of reflected signals 34R over several different output angles $\theta_R$ (at operation 156). This may, for example, allow external communications equipment to receive reflected signals 34R even if device 10 has no a priori knowledge of the location of the external communications equipment (e.g., to allow the external communications equipment to direct THF signals towards device 10 and/or to allow device 10 to direct THF signals towards the external communications equipment during subsequent THF communications). Control circuitry 14 may perform one or more (e.g., all) of operations 148-156. If desired, control circuitry 14 may perform two or more of operations 148-156 concurrently.

At optional operation 158, control circuitry 14 may use control signals $V_{BIAS}$ to place antenna(s) 30 into transmit mode 122 and/or receive mode 126 for performing THF communications with external communications equipment. Operation 158 may be omitted in examples where the antenna(s) 30 are only operable in reflective mode 124 (e.g., where the antennas are passive antennas). Control circuitry 14 may perform operation 146 for some of the antennas 30 in device 10 while concurrently performing operation 158 for other antennas 30 in device 10 if desired.

Figure 17:
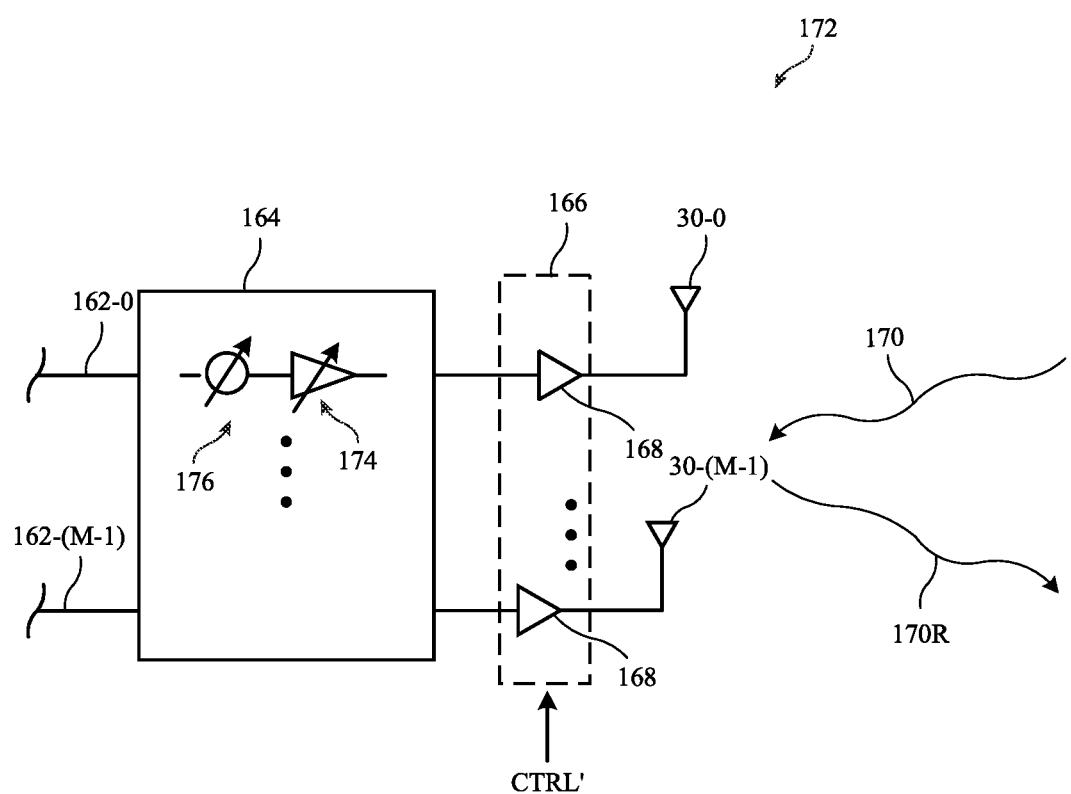
FIG. 17 is a circuit schematic diagram of an illustrative phased antenna array that may be configured to passively reflect radio-frequency signals at frequencies less than 100 GHz in accordance with some embodiments.

The examples of FIGS. 6-16 in which the antennas that are operable in reflective mode 124 convey THF signals is merely illustrative. If desired, device 10 may include one or more arrays of antennas that operate at lower frequencies and that are operable in reflective mode 124 (e.g., in addition to or instead of the antennas 30 that are operable in reflective mode 124 for THF signals). FIG. 17 is a circuit diagram showing how device 10 may include antennas 30 that are operable in reflective mode 124 but at frequencies less than around 100 GHz.

As shown in FIG. 17, device 10 may include one or more phased antenna arrays 172. Phased antenna array 172 may include M antennas 30 (e.g., antennas 30-0, 30-(M−1), etc.). Antennas 30 may be coupled to phase and magnitude controller block 164 via output amplifier stage 166. Output amplifier stage 166 may include output amplifiers 168 coupled to each antenna 30. Phase and magnitude controller block 164 may include phase controllers 176 and magnitude controllers 174 that adjust the phase and magnitude (respectively) of the signals conveyed over antennas 30. Phase and magnitude controller block 164 may map M radio-frequency (RF) multiple-input and multiple-output (MIMO) streams 162 (e.g., a first MIMO stream 162-0, an Mth MIMO stream 162-(M−1), etc.) onto the M antennas 30 in phased antenna array 172. Each MIMO stream 162 may be mapped to each antenna 30 or may be mapped to only a subset of antennas 30 by phase and magnitude controller block 164.

Phased antenna array 172 of FIG. 17 may convey radio-frequency signals at frequencies less than around 100 GHz. These signals may include millimeter wave and/or centimeter wave signals and/or may include signals below 10 GHz, for example. Phased antenna array 172 may be operable in reflective mode 124. In the reflective mode, control circuitry 14 may provide control signals CTRL' to output amplifier stage 168. Control signals CTRL' may adjust the output impedance of output amplifiers 168 to form one or more impedance mismatches between the output impedance of output amplifiers 168 and the input impedance of antennas 30. If desired, control circuitry 14 may use control signals CTRL' to adjust the output impedance of output amplifiers 168 to match the input impedance of antennas 30 during transmission and reception of radio-frequency signals. During reflection of radio-frequency signals (in the reflective mode), the impedance mismatches may cause phased antenna array 172 to reflect incident radio-frequency signals 170 as reflected radio-frequency signals 170R (sometimes referred to herein as reflected signals 170R). Control circuitry 14 may control the output impedances of output amplifiers 168 as a function of time and/or space to impart any desired phase and/or frequency shifts in reflected signals 170R relative to incident signals 170.

Device 10 may gather and/or use personally identifiable information. It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users. The optical components described herein (e.g., MZM modulator(s), waveguide(s), phase shifter(s), UTC PD(s), etc.) may be implemented in plasmonics technology if desired.

The methods and operations described above in connection with FIGS. 1-17 (e.g., the operations of FIGS. 12 and 16) may be performed by the components of device 10 using software, firmware, and/or hardware (e.g., dedicated circuitry or hardware). Software code for performing these operations may be stored on non-transitory computer readable storage media (e.g., tangible computer readable storage media) stored on one or more of the components of device 10 (e.g., storage circuitry 16 of FIG. 1). The software code may sometimes be referred to as software, data, instructions, program instructions, or code. The non-transitory computer readable storage media may include drives, non-volatile memory such as non-volatile random-access memory (NVRAM), removable flash drives or other removable media, other types of random-access memory, etc. Software stored on the non-transitory computer readable storage media may be executed by processing circuitry on one or more of the components of device 10 (e.g., processing circuitry 18 of FIG. 1, etc.). The processing circuitry may include microprocessors, central processing units (CPUs), application-specific integrated circuits with processing circuitry, or other processing circuitry.

The foregoing is merely illustrative and various modifications can be made to the described embodiments. The foregoing embodiments may be implemented individually or in any combination.

What is claimed is:

1. An electronic device comprising:
an antenna radiating element having an input impedance;
a photodiode coupled to the antenna radiating element and having an output impedance, the photodiode being configured to receive a control signal that places the photodiode into a selected one of a first mode in which the input impedance is mismatched with respect to the output impedance at a frequency greater than or equal to 100 GHz or a second mode in which the input impedance matches the output impedance at the frequency; and
an optical signal path configured to illuminate the photodiode using a first optical local oscillator (LO) signal and a second optical LO signal that is offset in wavelength with respect to the first optical LO signal while the photodiode is in the second mode, the antenna radiating element being configured to reflect wireless signals at the frequency while the photodiode is in the first mode.

2. The electronic device of claim 1, further comprising:
an optical modulator disposed along the optical signal path and configured to modulate wireless data onto the second optical LO signal while the photodiode is in the second mode, wherein the antenna radiating element is configured to transmit additional wireless signals at an additional frequency greater than or equal to 100 GHz while the photodiode is in the second mode.

3. The electronic device of claim 2, wherein the optical modulator comprises a Mach-Zehnder modulator (MZM).

4. The electronic device of claim 2, wherein the control signal comprises a first bias voltage and a second bias voltage that is different from the first bias voltage, the photodiode is configured to receive the first bias voltage while in the second mode, and the photodiode is configured to receive, using the antenna radiating element while the photodiode receives the second bias voltage, additional wireless signals.

5. The electronic device of claim 1, wherein the antenna radiating element is configured to receive additional wireless signals at an additional frequency greater than or equal to 100 GHz while the photodiode is in the second mode.

6. The electronic device of claim 1, wherein the photodiode is not illuminated by the first optical LO signal and the second optical LO signal while the photodiode is in the first mode.

7. The electronic device of claim 1, wherein the photodiode comprises a uni-travelling-carrier photodiode (UTC PD).

8. The electronic device of claim 1, wherein the photodiode comprises a PIN photodiode.

9. The electronic device of claim 1, wherein the photodiode comprises a graphene sublayer.

10. The electronic device of claim 1, further comprising:
one or more processors; and
a phased antenna array that includes the antenna radiating element and the photodiode, the one or more processors being configured to control the phased antenna array to form a signal beam of the wireless signals reflected by the antenna radiating element at the frequency in a selected beam pointing direction while the photodiode is in the first mode.

11. The electronic device of claim 1, further comprising:
one or more processors configured to perform space-time coding on the wireless signals reflected by the antenna radiating element by using the control signal to vary an amount of mismatch between the input impedance and the output impedance over time.

12. The electronic device of claim 1, further comprising:
one or more processors configured to use the control signal to impart a selected phase shift, a selected frequency shift, or a selected polarization change on the wireless signals reflected by the antenna radiating element.

13. The electronic device of claim 1, further comprising a terahertz lens overlapping the antenna radiating element.

14. A method of operating an electronic device having an array of antennas that include antenna radiating elements and photodiodes coupled to the antenna radiating elements, the method comprising:
generating, using the photodiodes, current on the antenna radiating elements that transmits first wireless signals at a frequency greater than or equal to 100 GHz while the photodiodes are illuminated using a first optical local oscillator (LO) signal and a second optical LO signal that is offset in wavelength with respect to the first optical LO signal; and reflecting, using the antenna radiating elements, second wireless signals at the frequency while the photodiodes are controlled to exhibit one or more output impedances that are mismatched at the frequency with respect to input impedances of the antenna radiating elements.

15. The method of claim 14, further comprising:

varying, using one or more processors, the one or more output impedances across the array.

16. The method of claim 14, further comprising:

encoding, using one or more processors, information in the second wireless signals reflected by the antenna radiating elements by varying the one or more output impedances.

17. The method of claim 14, further comprising:

varying, using one or more processors, the one or more output impedances to form a signal beam of the second wireless signals reflected by the antenna radiating elements that is oriented in a selected beam pointing direction.

18. An electronic device comprising:

a phased antenna array; and one or more processors configured to switch the phased antenna array between a first mode in which the phased antenna array is configured to transmit first wireless signals, a second mode in which the phased antenna array is configured to receive second wireless signals, and a third mode in which the phased antenna array is configured to reflect third wireless signals incident upon the phased antenna array.

19. The electronic device of claim 18 wherein, in the third mode, the phased antenna array is configured to reflect the third wireless signals from an incident angle onto a corresponding output angle.

20. The electronic device of claim 18, wherein the first wireless signals, the second wireless signals, and the third wireless signals are at a frequency greater than or equal to 100 GHz.

* * * * *